US011506247B2

(12) United States Patent
Yoder et al.

(10) Patent No.: US 11,506,247 B2
(45) Date of Patent: Nov. 22, 2022

(54) COMPACT ELECTROMAGNETIC PULSE DISCONNECT SYSTEM

(71) Applicant: Warn Automotive, LLC, Milwaukie, OR (US)

(72) Inventors: Bryan Yoder, Corvallis, OR (US); Evan Placek, Newberg, OR (US); Adam Reiner, Wilsonville, OR (US); Christopher James Boudreau, Estacada, OR (US); Adrian Simula, Livonia, MI (US); Blake Randall, Wilsonville, OR (US)

(73) Assignee: Warn Automotive, LLC, Milwaukie, OR (US)

( * ) Notice: Subject to any disclaimer, the term of this patent is extended or adjusted under 35 U.S.C. 154(b) by 151 days.

(21) Appl. No.: 17/087,301

(22) Filed: Nov. 2, 2020

(65) Prior Publication Data

US 2021/0048076 A1 Feb. 18, 2021

Related U.S. Application Data

(62) Division of application No. 16/206,791, filed on Nov. 30, 2018, now Pat. No. 10,955,013.

(51) Int. Cl.
*F16D 27/118* (2006.01)
*F16D 23/12* (2006.01)
(Continued)

(52) U.S. Cl.
CPC ............ *F16D 27/118* (2013.01); *F16D 11/04* (2013.01); *F16D 11/14* (2013.01); *F16D 23/12* (2013.01);
(Continued)

(58) Field of Classification Search
CPC .. F16D 27/118; F16D 11/14; F16D 2011/002; F16D 2011/006; F16D 23/12; F16D 2023/123
(Continued)

(56) References Cited

U.S. PATENT DOCUMENTS 3,096,863 A 7/1963 Shefke
4,685,550 A * 8/1987 Metcalf ................. H02K 16/00
192/114 R
(Continued)

FOREIGN PATENT DOCUMENTS

CN 1395051 2/2003
CN 102713357 10/2012
(Continued)

OTHER PUBLICATIONS

CN Office Action in Chinese Appln. No. 201911206560.1, dated Nov. 19, 2021, 18 pages (with English Translation).
(Continued)

*Primary Examiner* — Richard M Lorence
(74) *Attorney, Agent, or Firm* — Fish & Richardson P.C.

(57) ABSTRACT

Methods and systems are provided for an electromagnetic pulse disconnect assembly. In one example, an electromagnetic disconnect assembly includes an electromagnetic coil assembly including an electromagnetic coil, an armature cam including an annular ring and a plurality of bidirectional cam ramps extending in an axial direction from the annular ring, where the annular ring is adapted to have face-sharing contact with the electromagnetic coil assembly when the electromagnetic coil is energized and be spaced apart from the electromagnetic coil assembly when the electromagnetic coil is de-energized, and a cam follower a plurality of radially extending guides arranged around a circumference of the cam follower and spaced apart from one another via
(Continued)

a plurality of elongate apertures, each of the plurality of elongate apertures adapted to receive one of the plurality of bidirectional ramps of the armature cam. The assembly may further include a latching system.

12 Claims, 14 Drawing Sheets

(51) Int. Cl.
F16D 11/14 (2006.01)
F16D 11/04 (2006.01)
F16D 11/00 (2006.01)
F16D 48/06 (2006.01)
B60K 23/08 (2006.01)

(52) U.S. Cl.
CPC ............ *F16D 48/064* (2013.01); *B60K 23/08* (2013.01); *F16D 2011/002* (2013.01); *F16D 2011/006* (2013.01); *F16D 2023/123* (2013.01)

(58) Field of Classification Search
USPC .............................. 192/35, 69.42, 84.7, 93 R
See application file for complete search history.

(56) References Cited

U.S. PATENT DOCUMENTS

| | | | |
|---|---|---|---|
| 5,967,277 A | 10/1999 | Walter | |
| 9,347,503 B2 | 5/2016 | Gilmore | |
| 9,812,238 B2 | 11/2017 | Heravi et al. | |
| 9,915,298 B2 | 3/2018 | Heravi et al. | |
| 10,118,486 B2 | 11/2018 | Oram et al. | |
| 10,221,900 B2 | 3/2019 | Heravi et al. | |
| 10,955,013 B2 | 3/2021 | Yoder et al. | |
| 2007/0197338 A1 | 8/2007 | Fusegi | |
| 2015/0308519 A1* | 10/2015 | Heravi | F16D 48/064 192/84.92 |
| 2015/0380144 A1 | 12/2015 | Heravi et al. | |
| 2017/0198800 A1 | 7/2017 | Onitake et al. | |
| 2017/0335900 A1 | 11/2017 | Heravi et al. | |
| 2017/0352463 A1 | 12/2017 | Heravi et al. | |
| 2020/0173500 A1 | 6/2020 | Yoder et al. | |
| 2021/0115985 A1 | 4/2021 | Yoder et al. | |

FOREIGN PATENT DOCUMENTS

| | | |
|---|---|---|
| CN | 105034796 | 11/2015 |
| CN | 106499745 | 3/2017 |
| JP | 2000283177 | 10/2000 |
| JP | 2001012507 | 1/2001 |
| JP | 2004084906 | 3/2004 |
| JP | 2008069914 | 3/2008 |
| JP | 2014000913 | 1/2014 |
| JP | 2014098428 | 5/2014 |

OTHER PUBLICATIONS

CN Office Action in Chinese Appln. No. 201911206560.1, dated Mar. 30, 2021, 17 pages (with English Translation).

* cited by examiner

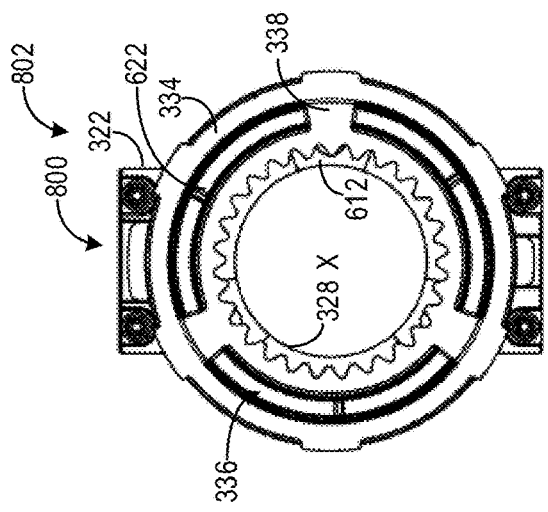
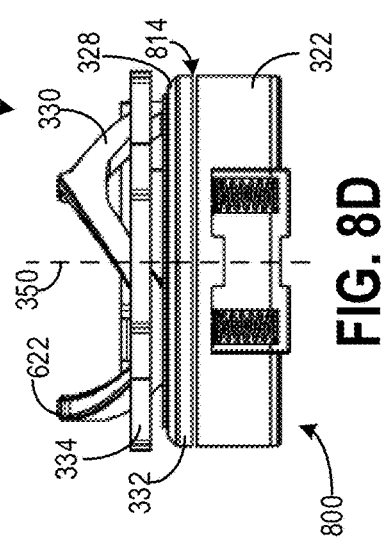
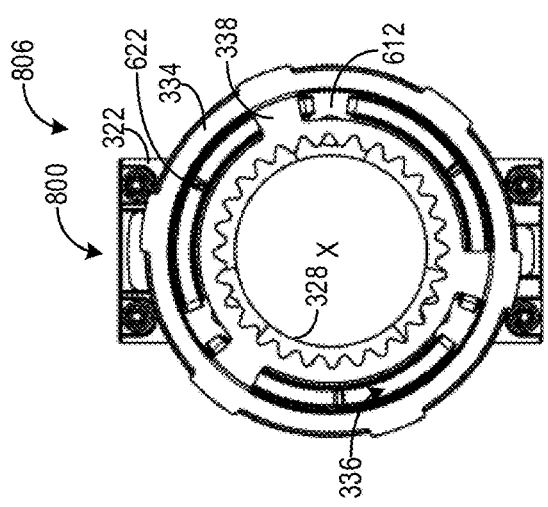
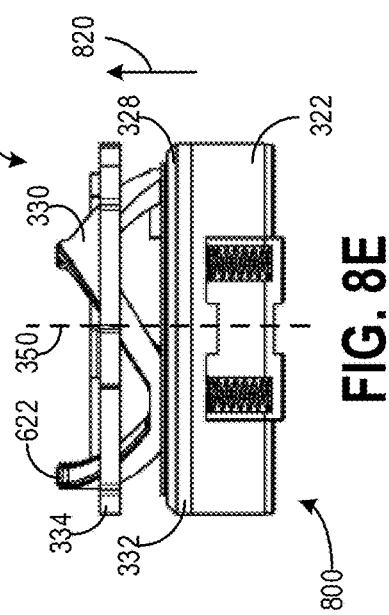
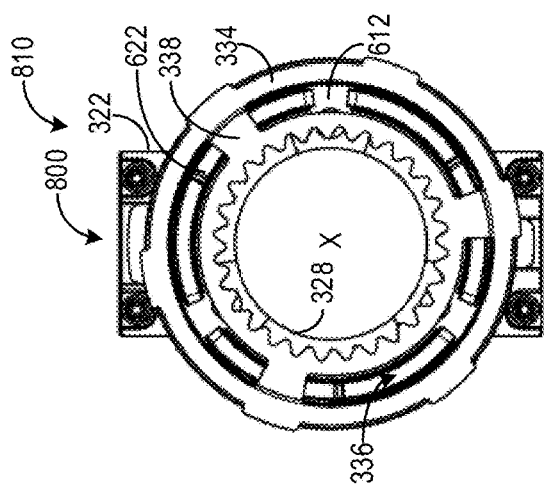
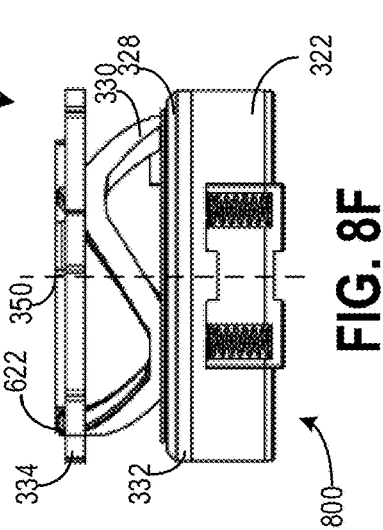

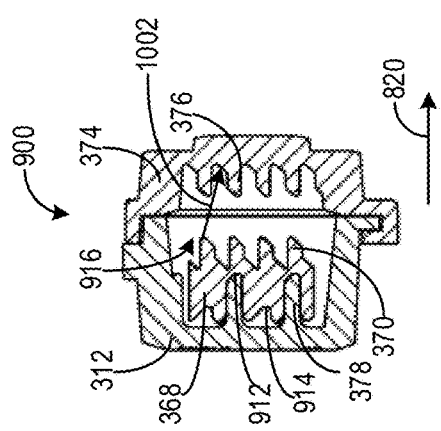
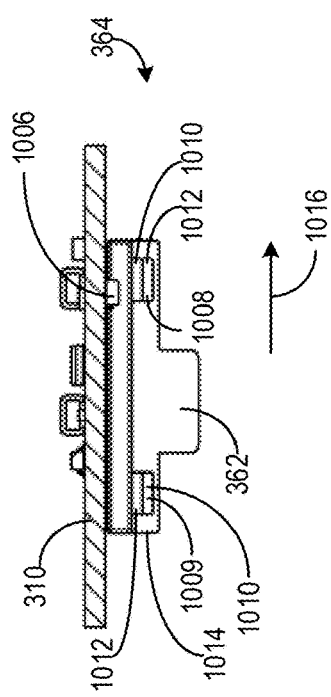
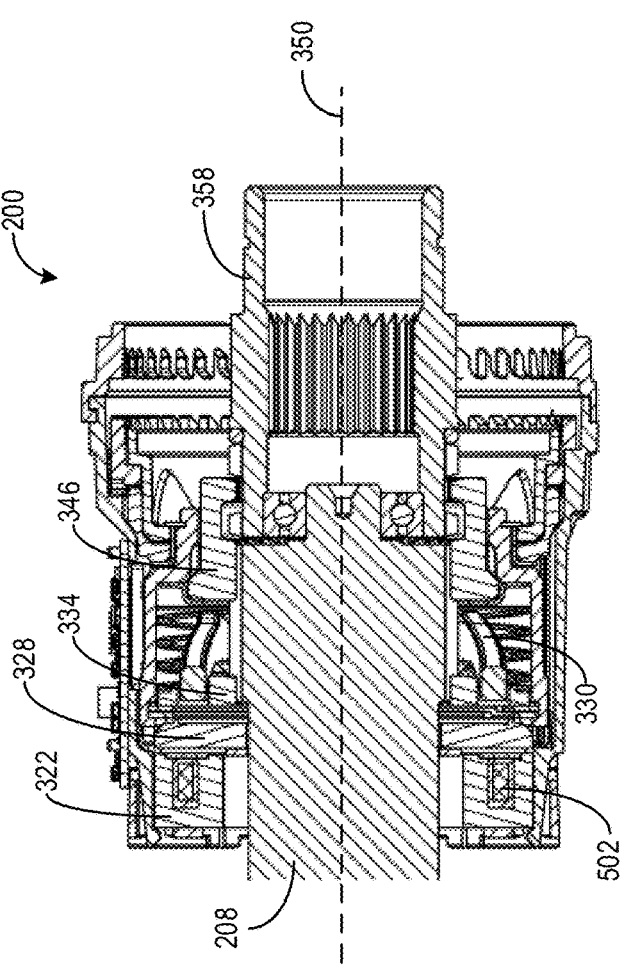

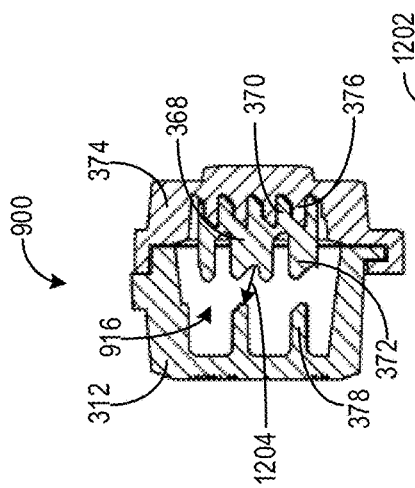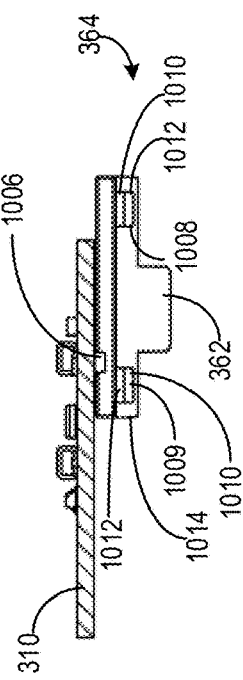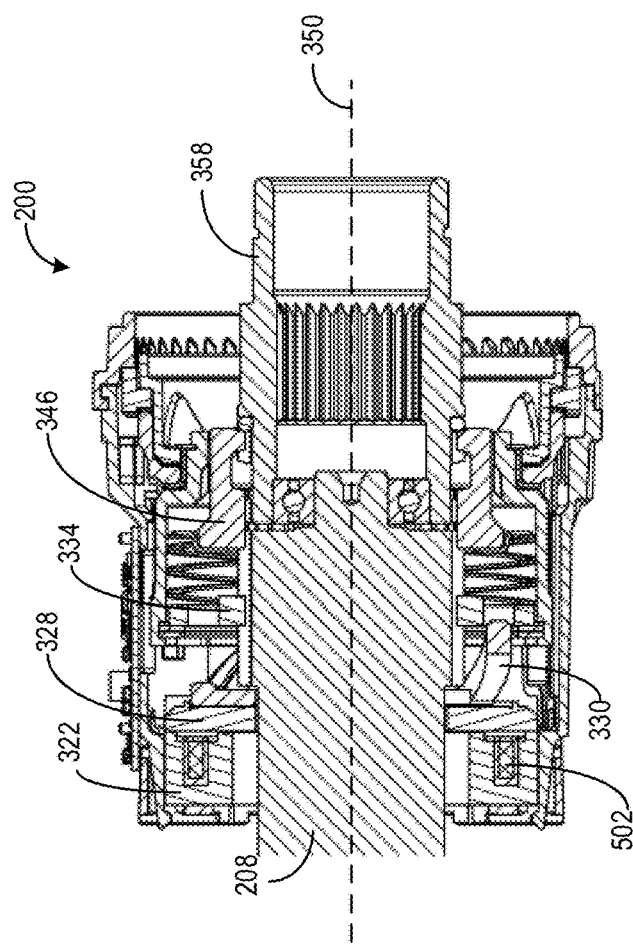
FIG. 12B
FIG. 12C
FIG. 12A

COMPACT ELECTROMAGNETIC PULSE DISCONNECT SYSTEM

CROSS-REFERENCE TO RELATED APPLICATIONS

The present application is a divisional of U.S. patent application Ser. No. 16/206,791, entitled "COMPACT ELECTROMAGNETIC PULSE DISCONNECT SYSTEM", filed on Nov. 30, 2018. The entire contents of the above-cited application is hereby incorporated by reference in their entirety for all purposes.

FIELD

The present application relates generally to a compact electromagnetic pulse disconnect assembly and related systems for engaging and disengaging two rotating components of a vehicle.

SUMMARY/BACKGROUND

Modern vehicles often incorporate one or more drivetrain modes for providing power from an engine to the driven wheels. For example, a vehicle with only a two-wheel drive system, or 4×2 mode, may provide power via one or a series of rotating shafts to two wheels of the vehicle. Vehicles such as compact cars may use a front wheel drive system with power provided to the two front wheels. In other, often larger vehicles, it is often desirable to incorporate both two-wheel drive and four-wheel drive driving modes, wherein power may be selectively distributed to two wheels in one mode and four wheels in another mode. Vehicles of different sizes often incorporate two-wheel drive of the rear wheels and four-wheel drive for the purpose of enabling better handling during varying traction conditions while still being able to switch to two-wheel drive to reduce fuel consumption and reduce wasted power.

For vehicles with switchable drive modes, devices and systems are needed for engaging and disengaging drivetrain components such as axles and shafts. As such, disconnect assemblies are used that often involve a form of clutch that can move to connect or disconnect two rotatable components such as two shafts. The disconnect assemblies can be placed in a variety of areas in the drivetrain of a vehicle, including at the wheel ends, at one or more axles, or along one of the drive shafts. Through the use of disconnect systems, vehicles can be made more versatile by having the ability to switch between different drive modes depending on the driving conditions and operator desire.

In some powertrain disconnecting systems, vacuum directed from the vehicle engine is used as the motive or actuating force that powers the disconnecting systems. In particular, the disconnecting system actuators may be powered by the vacuum. In many systems, the vacuum is directed via a passage from the intake manifold of the gasoline-fueled engine. Due to this, the vacuum level, or amount of force or pressure available from the vacuum, may vary as engine throttle settings change along with engine load. For many engine systems, the vacuum level (amount of pressure available) may be limited or vary due to the effects of altitude. Furthermore, temperature changes can also cause pressure fluctuations in the vacuum level, thereby causing fluctuations in movement of the disconnect actuator which may result in undesirable movement of disconnect components such as the diaphragm and clutch components. Additionally, in some vehicles vacuum may not be readily available since various vehicle accessory systems may not be powered by vacuum, or the vehicle may be designed to remove engine intake connections such as vacuum lines in order to enhance engine control and performance. Finally, vacuum-powered powertrain disconnect systems are becoming less desirable with more advanced vehicle design. As such, powertrain disconnect systems are needed that are powered by sources other than vacuum and feature designs conducive to modern vehicle systems.

Additionally, in other applications, such as other clutching or braking systems, motion may need to be retarded or produced quickly. In one example, electromagnetic coils may be utilized in wet plate clutches or locking differentials. However, the components included in a disconnect system employing electromagnetic coils for initializing transitions between clutch positions may be numerous, complex, and take up significant packaging space, thereby increasing a size of the entire system and reducing flexibility of the disconnect system (e.g., to be used in various applications. The inventors herein have recognized the above issues and developed various approaches to address them.

Thus in one example, the above issues may be at least partially addressed by an electromagnetic disconnect assembly, including: an electromagnetic coil assembly including an electromagnetic coil arranged within an annular housing of the coil assembly, where a first end of the annular housing includes a first face; an armature cam including an annular ring with an outer face and an inner face, a plurality of bidirectional cam ramps extending in an axial direction from the inner face, where the outer face is adapted to have face-sharing contact with the first face of the electromagnetic coil assembly when the electromagnetic coil is energized and be spaced apart from the first face via an air gap when the electromagnetic coil is de-energized; and a cam follower including an outer annular ring and an inner annular ring coupled together via a plurality of radially extending guides arranged around a circumference of the cam follower, the plurality of radially extending guides spaced apart from one another via a plurality of elongate apertures, each of the plurality of elongate apertures adapted to receive one of the plurality of bidirectional ramps of the armature cam.

In another example, the above issues may be at least partially addressed by an electromagnetic disconnect assembly, including: an electromagnetic coil assembly; a clutch ring; and a latching system adapted to hold the clutch ring in a first, engaged position where the clutch ring connects two rotating components or a second, disengaged position where the clutch ring is only connected to one of the two rotating components, after energizing the electromagnetic coil assembly to move the clutch ring into either the first or second position and after de-energizing the electromagnetic coil assembly, the latching system comprising: an annular, latching ring including a first set of teeth arranged on a first side of the latching ring and having a first profile with a single, same-depth tooth pattern that repeats around a circumference of the latching ring and a second set of teeth arranged on an opposite, second side of the latching ring and having a second profile with a different-depth tooth pattern having two different depths that repeats around the circumference of the latching ring; a guiding grooves cage including a third set of teeth adapted to interface with the first set of teeth in a single position; and a latching grooves cage including a fourth set of teeth adapted to interface with the second set of teeth in two different locking positions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 8A-8F show different views of an armature cam and cam follower assembly of the electromagnetic pulse disconcert assembly.

FIGS. 10A-10D show different assembly views of the electromagnetic pulse disconnect assembly in a 4×2 position.

FIGS. 12A-12C show different assembly views of the electromagnetic pulse disconnect assembly in an end-of-shift position.

FIGS. 2-12 are shown approximately to scale.

DETAILED DESCRIPTION

Figure 1:
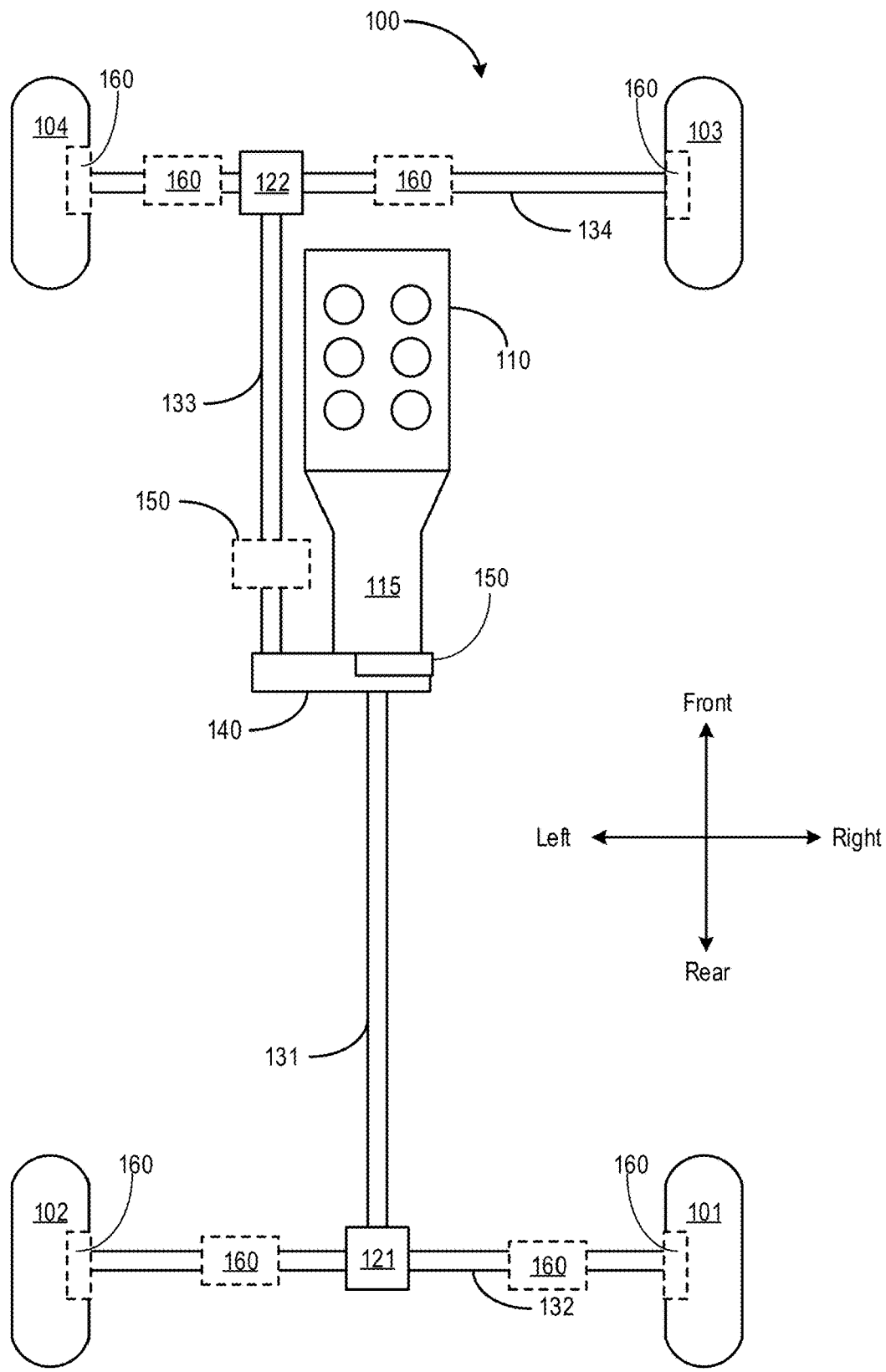
FIG. 1 shows a simplified powertrain of a vehicle in accordance with the present disclosure.
Figure 2A:
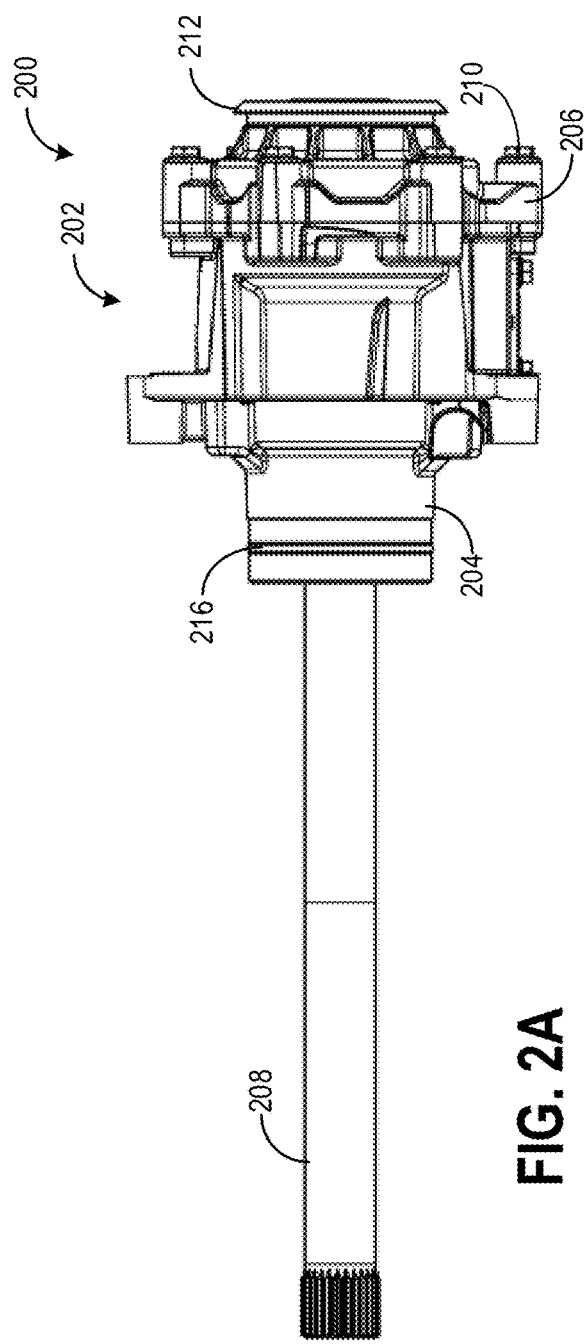
FIG. 2A shows a first external, assembled view of an electromagnetic pulse disconcert assembly.
Figure 2B:
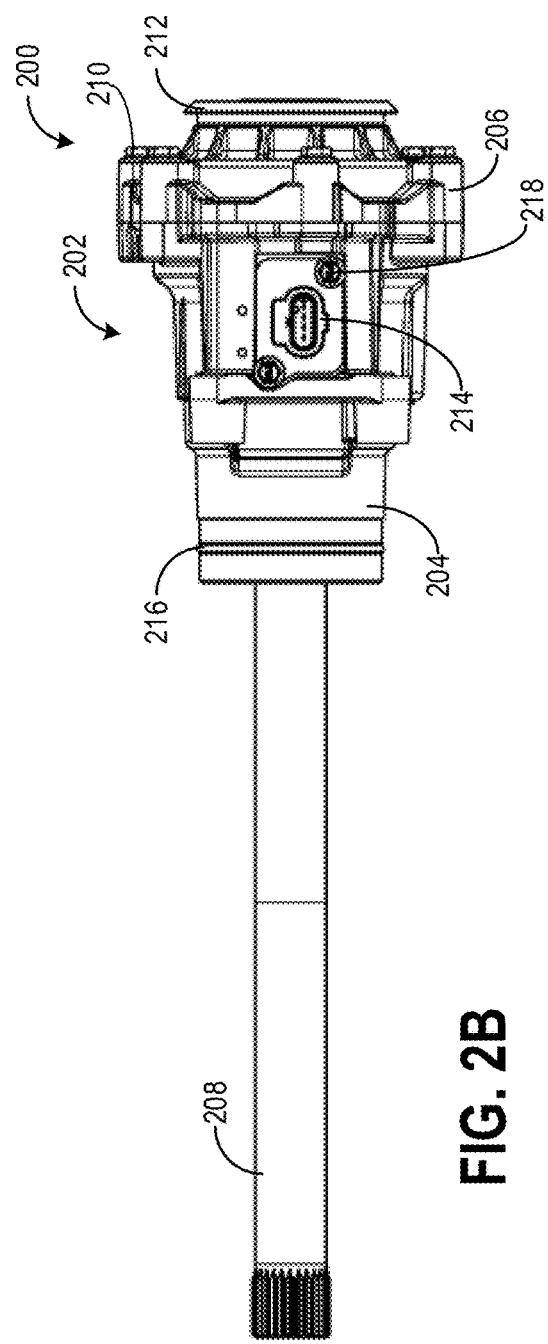
FIG. 2B shows a second external, assembled view of the electromagnetic pulse disconcert assembly.
Figure 3:
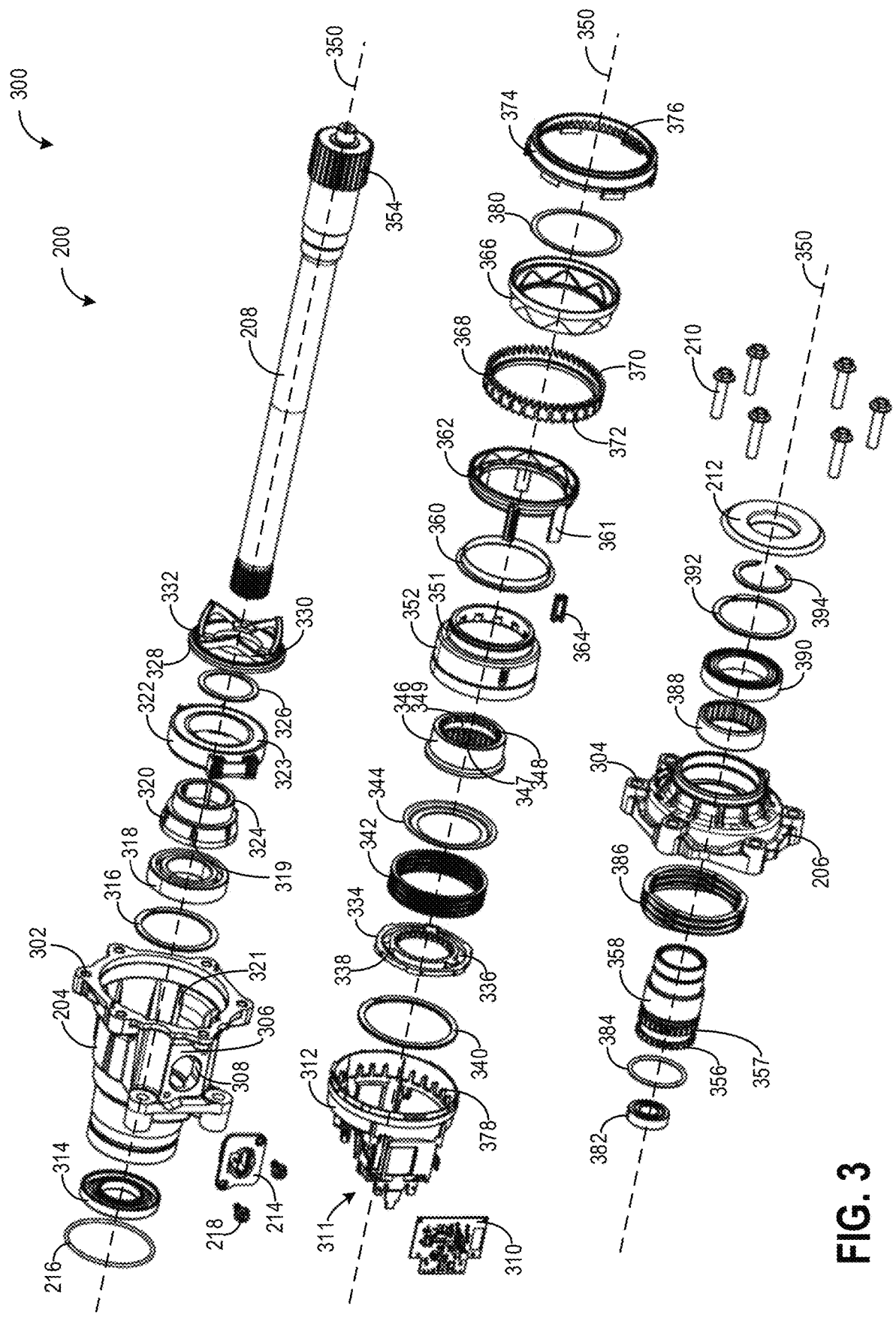
FIG. 3 shows an exploded view of the electromagnetic pulse disconcert assembly.
Figure 4:
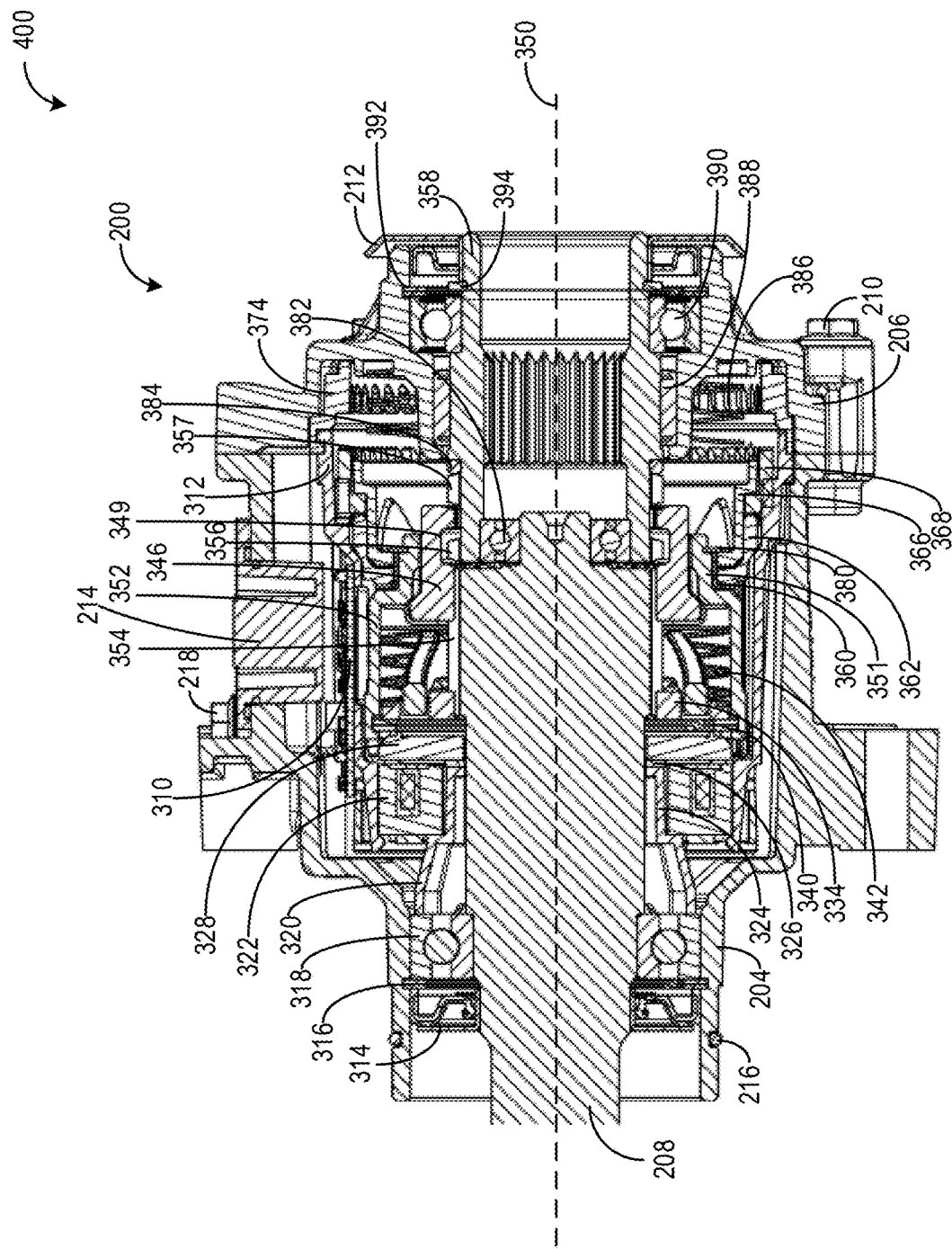
FIG. 4 shows an assembled, cross-sectional view of the electromagnetic pulse disconcert assembly.
Figure 9A:
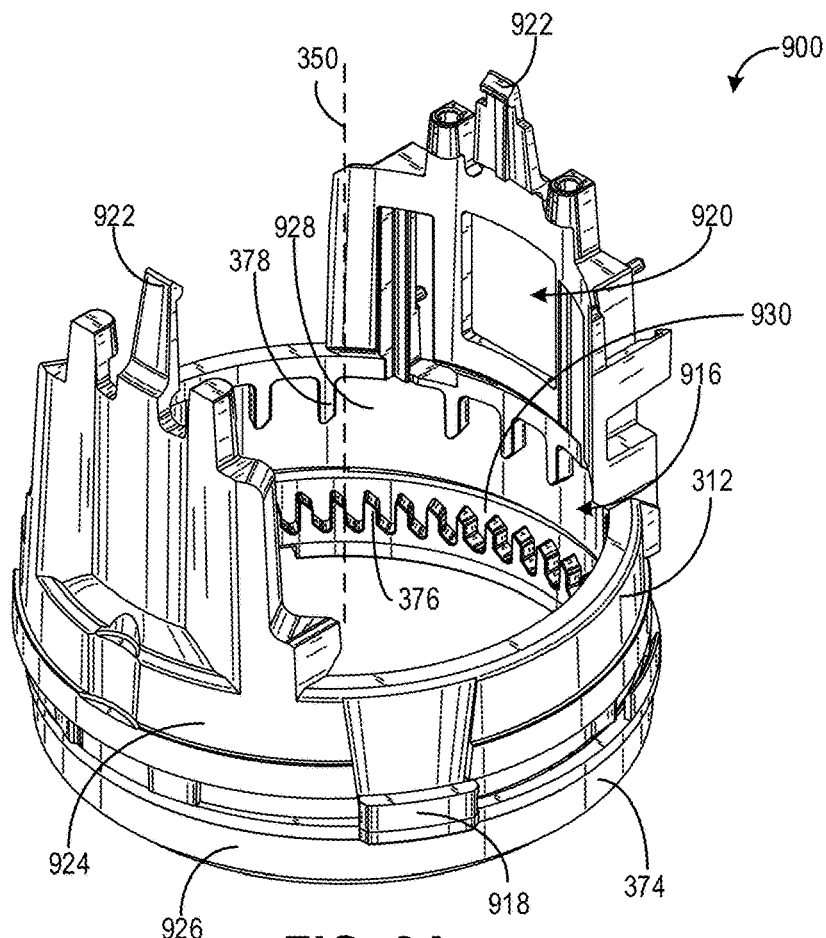
FIGS. 9A-9B show components of a latching system of the electromagnetic pulse disconnect system.
Figure 9B:
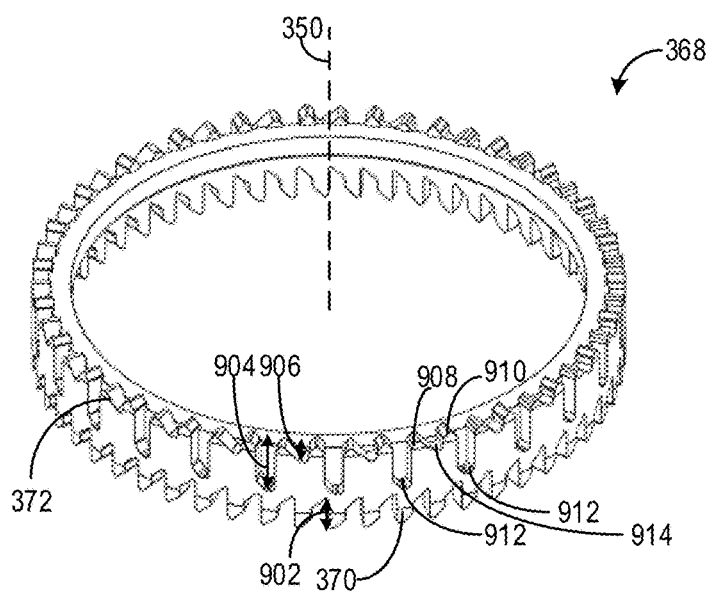
Figure 13A:
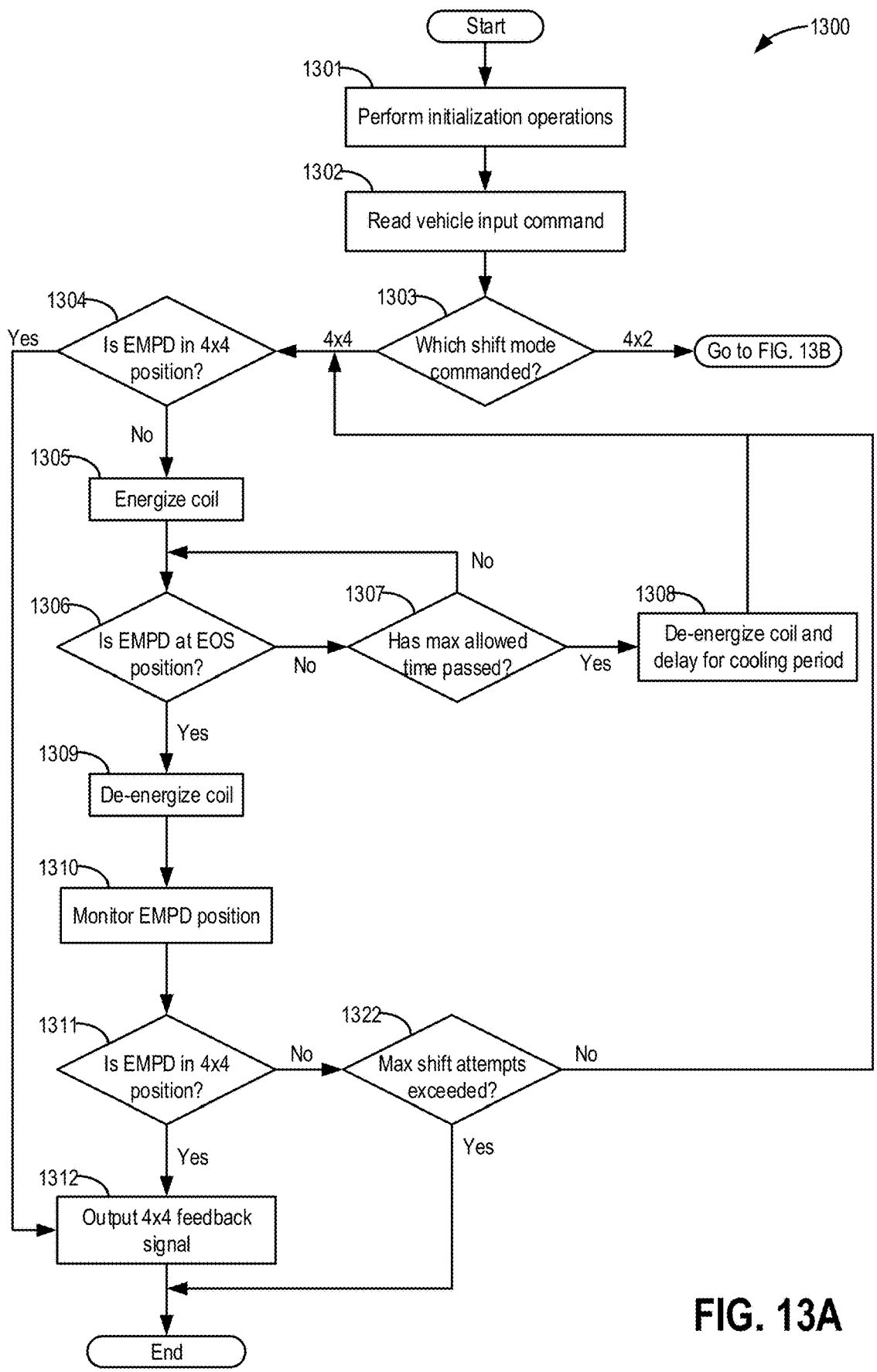
FIGS. 13A-B show a flow chart of a method for shifting the electromagnetic pulse disconcert assembly between the 4×2 and 4×4 positions.
Figure 13B:
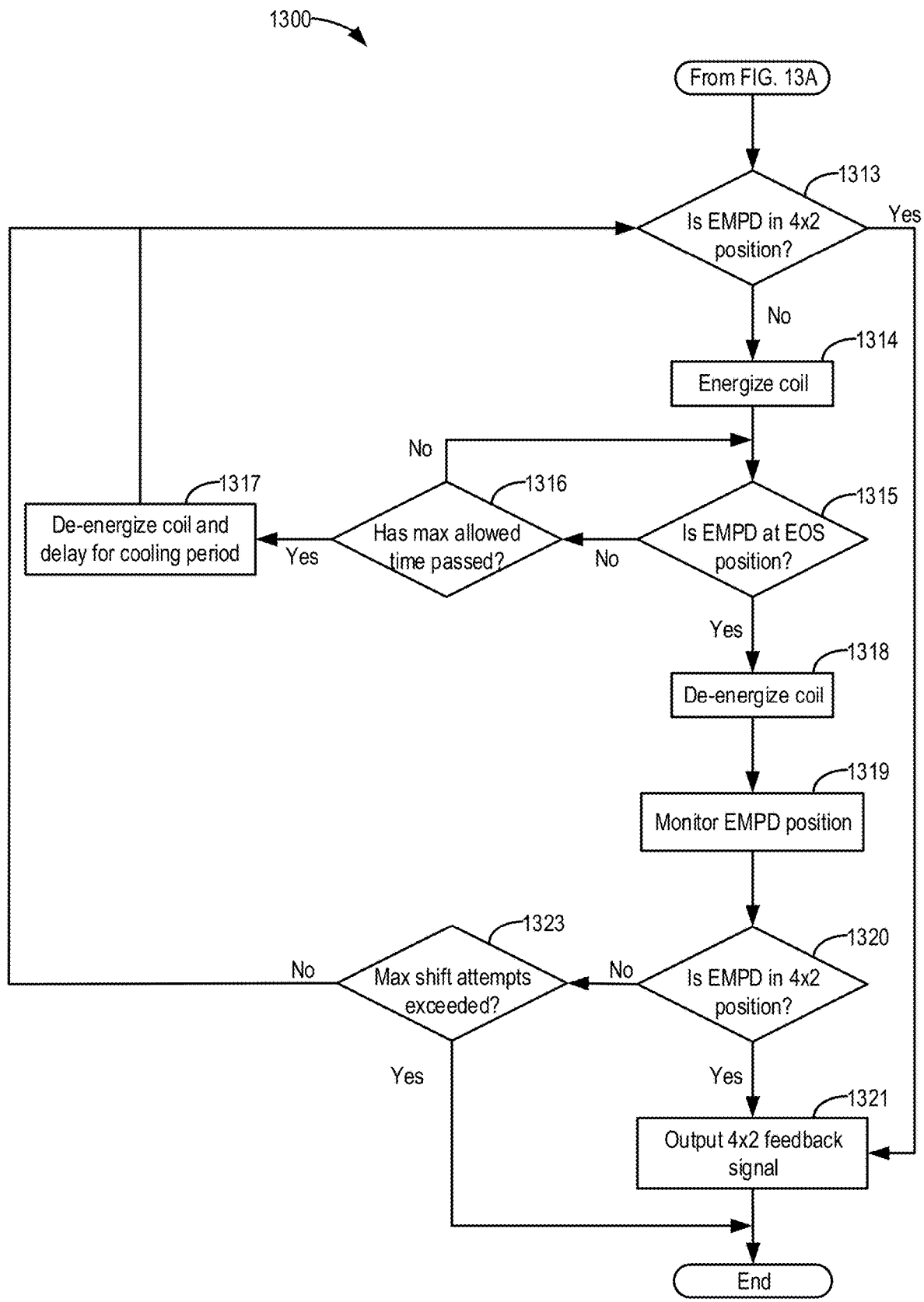

The following detailed description relates to systems and methods for an electromagnetic pulse disconnect (EMPD) assembly and selectively connecting rotating components of a vehicle. An example embodiment of a vehicle powertrain is shown in FIG. 1, including an engine, a transmission, various axles and shafts, and wheels for providing motive power to the vehicle. An embodiment of an EMPD assembly operated by discrete electrical pulses to an electromagnetic coil of the assembly is shown in FIGS. 2-12C, which may be used with the powertrain of FIG. 1. In particular, FIGS. 2A-2B show external, assembled views of the EMPD assembly, FIG. 3 shows an exploded view of the EMPD assembly, and FIG. 4 shows an assembled, cross-sectional view of the EMPD assembly. The EMPD assembly includes an electromagnetic coil (shown in FIGS. 5A-5E), an armature cam that interfaces with a cam follower (shown in FIGS. 6A-8F), and a clutch ring for selectively engaging two adjacent rotating components (e.g., such as shafts or axles). As such, the EMPD assembly may move the clutch ring into a 4×4 position wherein the two rotating components are rotatably coupled to one another and into a 4×2 position wherein the two rotating components are not rotatably coupled to one another. FIGS. 10A-12C show partially assembled, cross-sectional, sensor, and latching system views of the EMPD assembly in the different shift positions (e.g., 4×2, end of shift, and 4×4 positions). The EMPD assembly may further include a latching system, as shown in FIGS. 9A and 9B, which holds the assembly in the selected shift position without requiring the electromagnetic coil to remain energized. In this way, the coil may only be energized when moving from one shift position to another. An example latching mechanism of the latching system is shown in FIGS. 3, 9A, 9B, 10B, 11B, and 12B. The EMPD assembly may further include a magnetic position sensor assembly for determining a shift position of the assembly, as shown in FIGS. 10D, 11D, and 12C. FIGS. 13A-13B show a flow chart of a method for operating the EMPD assembly according to commanded shift modes (e.g., positions). The EMPD assembly may be disposed at various positions along a vehicle drivetrain (such as the drivetrain shown in FIG. 1). For example, the EMPD assembly may be positioned proximate a wheel end (e.g., as a wheel end disconnect) and/or positioned on a front or rear wheel axle (e.g., as a center disconnect). While internal components of the EMPD assembly may be substantially the same between a center and wheel end disconnect, the outer housings (e.g., casings) of the assembly may be altered to accommodate the specific location along the drivetrain.

Regarding terminology used throughout this detailed description, vehicle operation where only two wheels receive power from the engine may be referred to as two-wheel drive, or 2WD, or 4×2. The corresponding position of the electromagnetic pulse disconnect may be referred to as a 4×2 position. Alternatively, vehicle operation where all four wheels receive power from the engine may be referred to as four-wheel drive, or 4WD, or 4×4. The corresponding position of the electromagnetic pulse disconnect may be referred to as a 4×4 position. In other examples, four-wheel drive may be interchangeably referred to as all-wheel drive (AWD), wherein normally unpowered wheels may receive power during certain conditions. To accomplish shifting between 4WD and 2WD, the electromagnetic pulse disconnect may selectively engage two rotating components. In some embodiments, the rotating components may be axles, shafts, couplers, wheel hub assemblies, or other devices used in the drivetrain of the vehicle for transmitting rotational power.

Modern vehicles may be operated by a large variety of drivetrain systems that involve selectively powering different wheels according to different operating conditions and/or operator (i.e. driver) commands. For example, all-wheel drive vehicles may provide power to two collinear wheels during a first operating mode, and upon detection of slippage may also provide power to one or more of the remaining wheels. In other examples, a smaller vehicle, such as a passenger car, may permanently provide power to only the front two wheels of the vehicle in order to increase fuel economy (front two-wheel drive). Yet in other examples, a vehicle may be configured to selectively switch between a two-wheel drive and a four-wheel drive mode, wherein during the four-wheel drive mode all four wheels receive power. There are advantages and disadvantages to each vehicle drivetrain, and the particular utility and anticipated function of each vehicle may aid in determining which drivetrain to incorporate.

FIG. 1 shows a simple diagram of a powertrain 100 of a vehicle. In this diagram, the body of the vehicle along with many other components are removed for better viewing of powertrain 100. It is noted that the powertrain includes the components seen in FIG. 1 while a drivetrain may refer to the components of FIG. 1 excluding the engine and transmission, described further below. According to the powertrain configuration, the vehicle of FIG. 1 may be have a selective 4WD drivetrain, wherein the rear wheels are powered in a rear-wheel drive mode (or 2WD mode) and all four wheels are powered in a 4WD mode, the 4WD drive mode different than the 2WD mode. Many utility vehicles such as larger trucks, all-terrain vehicles, and sports utility vehicles may incorporate rear-wheel drive rather than front-wheel drive for various reasons. One reason may be that rear-wheel drive is more conducive to load hauling or pulling, such as towing via a trailer connected to the rear of the vehicle.

In FIG. 1, a right rear wheel 101 and left rear wheel 102 are positioned at the rear of the vehicle, that is, the end located behind an operator of the vehicle. In this example, left, right, front, and rear orientations are given according to the perspective of the operator of the vehicle. Directional arrows for the front, rear, left, and right orientations are shown in FIG. 1. Accordingly, a right front wheel 103 and a left front wheel 104 are positioned at the front of the vehicle.

Power from the vehicle of FIG. 1 is generated by an internal combustion engine 110 having multiple cylinders. Engine 110 can be a fueled by gasoline or diesel according to the specific vehicle, and in the present example engine 110 contains six cylinders configured in a V orientation, forming a V6 engine. It is understood that engine 110 may be configured in different orientations and contain a different number of cylinders while providing power in a similar fashion as seen in FIG. 1. A shaft powered by engine 110 may be directly coupled to a transmission 115 providing the necessary gearing for driving the vehicle. Transmission 115 may be a manual or automatic transmission according to the requirements of the vehicle system. A rear drive shaft 131 may be connected to transmission 115 as an output of the transmission, providing power to the rear end of the vehicle.

During the aforementioned 2WD mode of powertrain 100, wheels 101 and 102 are powered via a rear axle 132. Rear axle 132 may be a single continuous shaft in some embodiments, or may be split into two axles in a bi-axle configuration, wherein the axle is interposed with a rear differential 121. In the bi-axle configuration, a first rear axle may be positioned between the rear differential 121 and the right rear wheel 101 and a second rear axle may be positioned between the rear differential 121 and the left rear wheel 102. The rear differential is also attached to rear drive shaft 131. The rear differential may serve several purposes, including allowing different relative rotational speeds between wheels 101 and 102 and transferring rotation (and power) from a single direction of drive shaft 131 into two perpendicular directions of rear axle 132, as seen in FIG. 1. For example, if the vehicle is turning in the left direction, then the inboard wheel (wheel 102) may rotate at a lower speed than the rotation of the outboard wheel (wheel 101). As such, rear differential 121 may allow the two wheels to rotate at different speeds in order to avoid slipping between the wheels of the vehicle and a road that the vehicle is traveling across during a turn.

For operation of the aforementioned 4WD mode, wherein the front wheels are driven in addition to the nominally-powered rear wheels, a system is provided to transfer power to the front of the vehicle. A transfer case 140 may be positioned near the output of transmission 115, the transfer case 140 may be configured to direct a portion of power from engine 110 to a front drive shaft 133. In one embodiment, the transfer case 140 may utilize a chain to transfer a portion of power from rear drive shaft 131 to front drive shaft 133. In a similar fashion to the rear drive system, for the front drive shaft 133 connects to a front differential 122. The front differential 122 may be substantially the same as rear differential 121, in that the front differential 122 allows relative rotational speeds of two wheels. As such, a front axle 134, which may be divided into two axles of a bi-axle system, may be attached to differential 122 on one end and to their respective front left wheel 104 and front right wheel 103. In this configuration, drive power from front drive shaft 133 may be transferred through front differential 122 and to wheels 103 and 104 via front axle 134. Since transfer case 140 allows power to be outputted to both the front and rear axles, the 4WD mode may allow all four wheels to be powered simultaneously. Said another way, when the vehicle is in the 4WD mode, both the front wheels 103 and 104 and back wheels 101 and 102 may be driven.

For switching between 4WD and 2WD in the example of FIG. 1, a system is needed that selectively engages and disengages power input to the front wheels. As such, a disconnect 150 may be provided inside transfer case 140 positioned in-line with an output shaft of transmission 115. In this configuration, disconnect 150 may also be integrally formed with or separate from transfer case 140. Disconnects may be used in vehicles with more than one drivetrain mode and enable engaging or disengaging between two separate, rotatable input components, such as wheel hubs, axles, and drive shafts. In the present example as seen in FIG. 1, disconnect 150 is positioned inside transfer case 140. In other vehicle systems, disconnect 150 may be placed in a variety of locations, including on front axle 134 or on front drive shaft 133, effectively dividing the shaft into two separate lengths as seen by the dashed disconnect 150 in FIG. 1. In other examples, the disconnect 150 may be positioned at a power transfer unit (PTU) to enable engagement and disengagement of the PTU shaft output. Furthermore, in some embodiments, multiple disconnects may be provided, wherein each of the multiple disconnects may be fixed to a separate component of powertrain 100. In one example, a first disconnect 150 may be placed inside transfer case 140 as seen in FIG. 1, while additional disconnects may be attached to the wheel hub of wheel 103, the wheel hub of wheel 104, and/or along front axle 134. In this way, the disconnects 150 may be controlled separately or in conjunction with each other. Depending on the particular location of the disconnect, various names are given, including wheel end disconnect and center axle disconnect. In the present example, disconnect 150 may selectively connect and disconnect gears inside transfer case 140 that drive the chain that powers front drive shaft 133. As such, disconnect 150 effectively divides transfer case 140 (and shaft 133) from the transmission 115 and rear drive shaft 131 via a system of gears, control mechanisms, and other structure, as described later in more detail.

During the 2WD mode when power is only provided to rear wheels 101 and 102, an input command may cause disconnect 150 to disengage fixed rotation between the two lengths of shaft 133, thereby providing no power to front axle 134 as well as wheels 103 and 104. As such, most power provided by engine 110 can be directed into rear drive shaft 131 with a relatively smaller amount of power diverted through transfer case 140 and into the length of shaft 133 connected to the disconnect. In other words, while disengaged, front wheels 103 and 104 may rotate freely without receiving tractive power from the engine. Also, the rotation of wheels 103 and 104 along with the rotation of axle 134 and the portion of shaft 133 disposed in front of disconnect 150 (as directed by the arrow in FIG. 1) does not affect the rotation of the rest of the drivetrain. Specifically, since disconnect 150 separates the two portions of shaft 133 located to the front and rear of the disconnect, rotation of the two lengths do not affect each other because they are separated (disengaged). If multiple disconnects 150 are provided, wherein one disconnect is in transfer case 140 or at shaft 133 while another disconnect is at wheel 103 and yet another disconnect is at wheel 104, then front axle 134 and a portion or all of shaft 133 may cease rotating when the disconnects disengage their input components. As such, front differential 122 may also cease rotating while the disconnects disengage rotation between wheels 103 and 104 and axle 134. In this way, fuel consumption may be reduced since wheels 103 and 104 may rotate freely without the added rotational inertia (moment of inertia) of axle 134 and frictional drag of differential 122.

During the 4WD mode when power is provided to all four wheels, an input command may cause disconnect 150 to engage fixed rotation between the two lengths of shaft 133, thereby providing power to all of shaft 133 as well as axle 134. In the current example, fixed rotation may be caused by engagement between a series of gears and/or splined shafts that allows the shafts on either end of disconnect 150 to rotate as a substantially single unit. During this operating mode, power from engine 110 power may be diverted substantially equally (or in other embodiments, non-equally) to wheels 101, 102, 103, and 104. It is noted that other drive modes are possible with the addition, change, and/or removal of components while still conforming to the scope of this disclosure.

Additionally, the powertrain 100 may include an electromagnetic pulse (EMPD) disconnect 160 positioned at one or more wheel ends to engage and disengage individual wheels with a corresponding axle (e.g., front axle 134 and/or rear axle 132). This type of disconnect may be referred to herein as a wheel end disconnect. The electromagnetic pulse disconnect 160 may alternately be positioned on one or both of the front axle 134 and the rear axle 132. Further, the electromagnetic pulse disconnect 160 may be positioned on either side of the front differential 122 and/or the rear differential 121. For example, in one embodiment, there may be a motorized disconnect 160 positioned on each side (e.g., both sides) of the front differential 122 on the front axle 134. Additionally, or alternatively, there may be a motorized disconnect 160 positioned on each side (e.g., both sides) of the rear differential 121 along the rear axle 132. In this way, the vehicle powertrain 100 may include a dual-disconnecting differential system. The type of disconnect positioned along the front or rear axles proximate to the front or rear differentials may be referred to herein as a center disconnect. The electromagnetic pulse disconnect described below may be used in one or more of the positions of the electromagnetic pulse disconnect 160 shown in FIG. 1.

As previously mentioned, some disconnects may be powered by vacuum diverted from the engine, such as engine 110 of FIG. 1. However, the inventors herein have recognized that vacuum may not be readily available or the vacuum power may undesirably fluctuate, thereby resulting in decreased disconnect control. Thus, alternate power sources may be utilized that provide simpler and more compact disconnect designs. As such, the inventors herein have proposed an electromagnetic pulse disconnect assembly that is actuated by pulsed electric power to an electromagnetic coil on the disconnect assembly. Electric power may not require running vacuum lines throughout the vehicle, thereby increasing the reliability of electric power over vacuum power. First, a description of the various components of the proposed electromagnetic pulse disconnect will be given, followed by a description of the operation of the disconnect including an example control scheme.

Figure 5D:
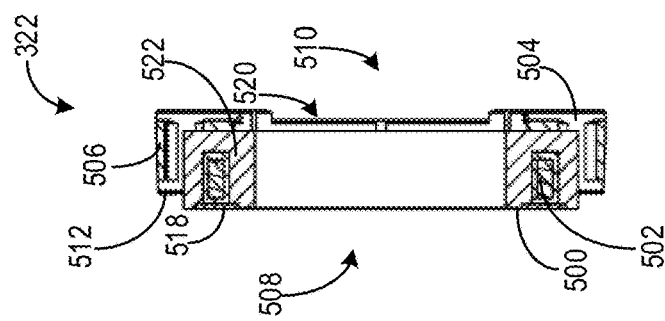
FIGS. 5A-5E show different views of a coil assembly of the electromagnetic pulse disconcert assembly.
Figure 5E:
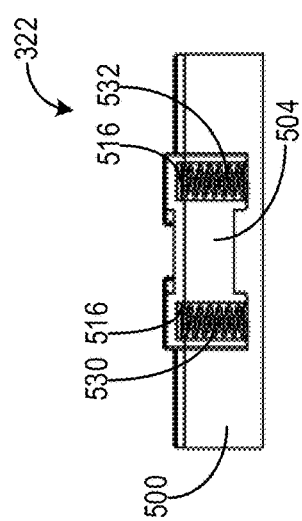
Figure 5C:
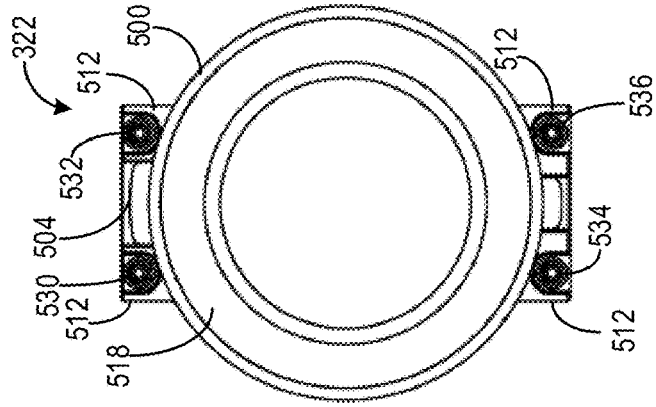
Figure 5B:
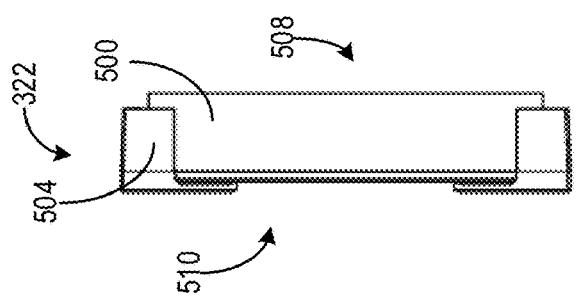
Figure 5A:
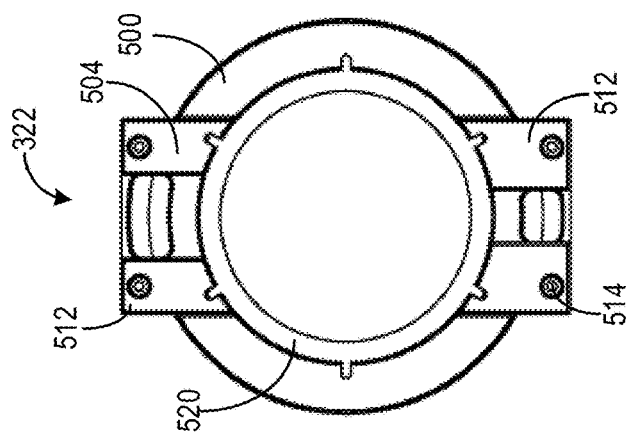
Figure 6A:
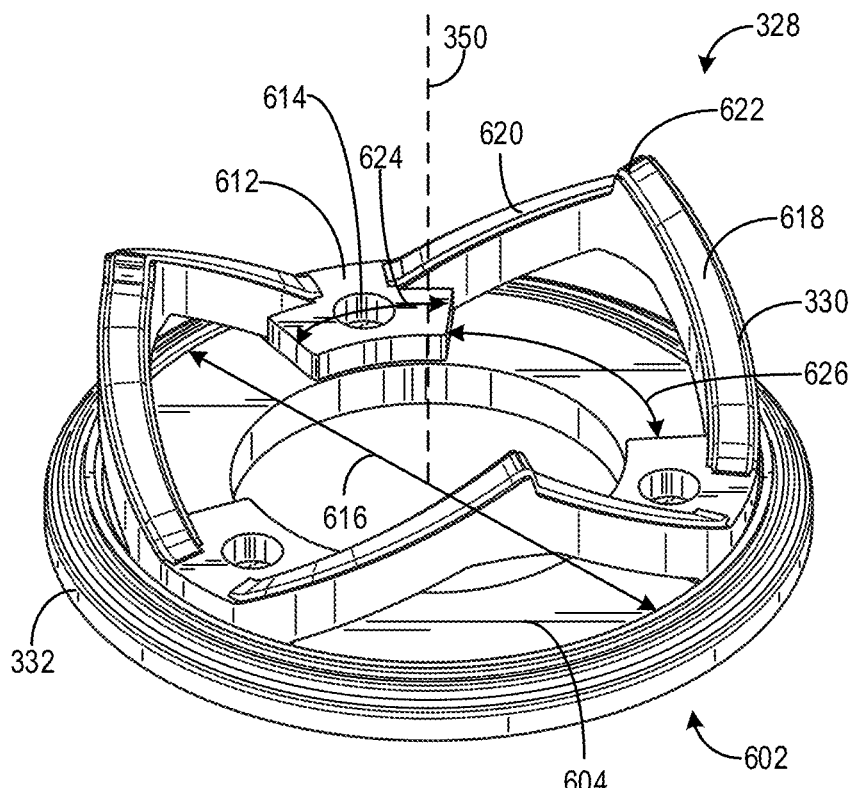
FIGS. 6A-6B show detailed views of an armature cam of the electromagnetic pulse disconnect assembly.
Figure 6B:
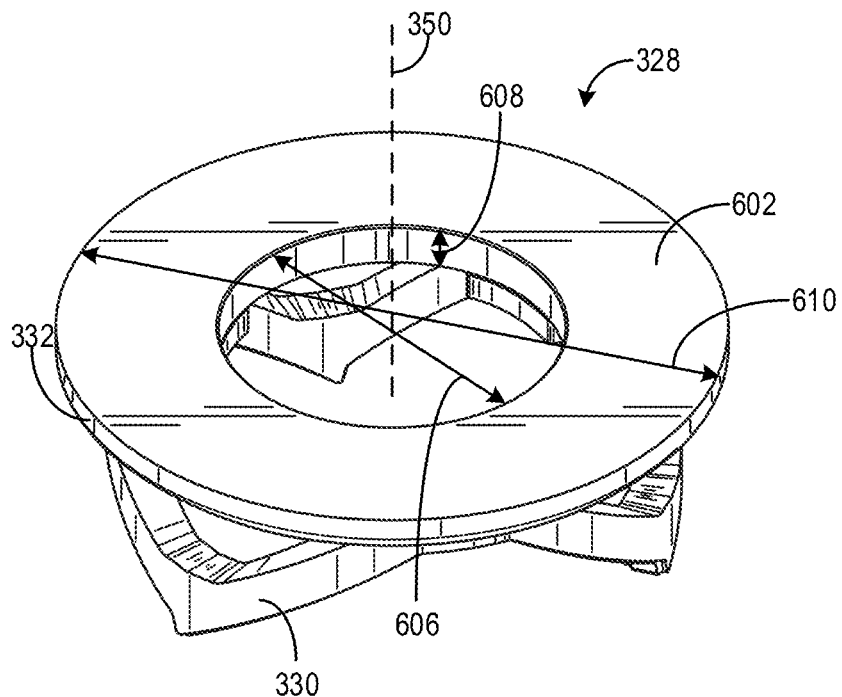
Figure 7:
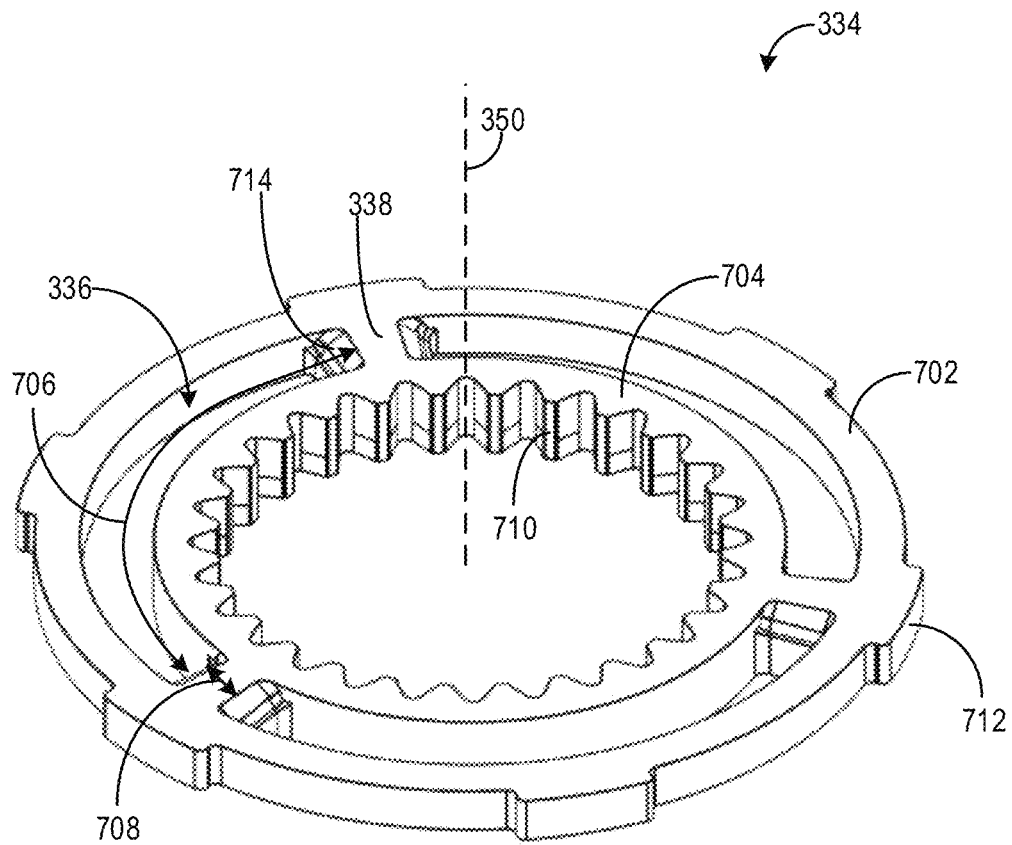
FIG. 7 shows a detailed view of a cam follower of the electromagnetic pulse disconnect assembly.

FIGS. 2-9 show different views and aspects of an embodiment of an electromagnetic pulse disconnect (EMPD) assembly 200. In particular, FIGS. 2A-2B show external views of the assembled EMPD assembly 200. An exploded (e.g., disassembled) view of the EMPD assembly 200 is shown in FIG. 3 and an assembled, partial cross-section view of the EMPD assembly 200 is shown in FIG. 4. FIGS. 5A-5D show different views of a coil assembly of the EMPD assembly 200 and FIGS. 6A-6B and 7 show detailed views of an armature cam and cam follower, respectively of the EMPD assembly 200. FIGS. 8A-8F show different views of the armature cam and cam follower assembly of the EMPD assembly 200 in different shift positions. As explained further below, the EMPD assembly 200 is configured to shift into a plurality of different positions, including a 4×2 (e.g., disengaged) position, end-of-shift (EOS) position, and a 4×4 (e.g., engaged) position. These different positions of the EMPD assembly 200 are depicted in the different views of FIGS. 10A-12C. The same parts across FIGS. 2-12C are numbered the same and may be discussed collectively below with reference to the different figures.

Turning first to FIGS. 2A-2B, FIG. 2A shows a side view of the assembled EMPD assembly 200 while FIG. 2B shows a top view of the assembled EMPD assembly 200. As shown in FIGS. 2A-2B, the EMPD assembly 200 includes an outer housing 202, the outer housing 202 including a base housing 204 and end housing 206 coupled to one another via one or more fasteners (e.g., screws) 210. As such, the base housing 204 and end housing 206 form an entirety of the outer housing 202 and fully enclose (and entirely surrounds on all sides) the internal components of the EMPD 200, except for a link shaft 208. As such, external dirt and debris may not enter inside the outer housing 202, thereby increasing the longevity, decreasing degradation, and improving the operation of the EMPD 200. Additionally, the base housing 204 includes a connector housing 214 adapted to receive and surround an electrical connector for electrically coupling the controller of the EMPD 200 (as seen in FIG. 3) to an external source, such as a vehicle controller and/or power source. The connector housing 214 is removably coupled to a remainder of the base housing 204 via a plurality of fasteners (e.g., screws) 218. FIGS. 2A-2B further show a gasket 216 on the base housing 204.

As explained further below, the EMPD assembly 200 is adapted to selectively connect and disconnect (e.g., engage and disengage) the link shaft 208 and a drive gear (internal component of the EMPD assembly 200, not visible in FIGS. 2A-2B), the drive gear adapted to drive and connect to another rotating component, such as an axle shaft (e.g., half shaft) or other rotating shaft coupleable to a vehicle component, such as a drive wheel. The shaft that is adapted to be connected to and driven by the drive gear is sealed against the end housing 206 via a shaft seal 212, such that no debris may enter the outer housing 202, while still allowing the shaft to rotate.

FIG. 3 shows an exploded view 300 of the EMPD assembly 200 while FIG. 4 shows an assembled, cross-sectional view 400 of the EMPD assembly 200, both FIGS. 3 and 4 showing all the internal components of the EMPD assembly 200 contained within an interior of the outer housing 202 discussed above with reference to FIGS.

2A-2B. FIGS. 3 and 4 again show the base housing 204, end housing 206, and fasteners 210 for coupling the base housing 204 to the end housing 206. As shown in FIG. 3, the base housing 204 includes a first plurality of apertures 302 and the end housing 206 includes a second plurality of apertures 304 for receiving the fasteners 210. The first plurality of apertures 302 and second plurality of apertures 304 are arranged in respective flanges of the base housing 204 and end housing 206, where the flanges have face-sharing contact with one another when the outer housing 202 is assembled (e.g., the base housing 204 is coupled to the end housing 206). Also shown in FIG. 3, is the connector housing 214 which couples to an outer mounting face 306 and receiving cavity 308 arranged on one side of the base housing 204. The receiving cavity 308 extends through an entirety of a thickness of the base housing 204 so that an electrical connector inserted through the connector housing 214 may provide power to a controller 310 of the EMPD assembly 200. The controller 310 is adapted to be coupled to a side of a latching grooves cage 312 which fits within the base housing 204 when the EMPD assembly 200 is assembled (as shown in FIG. 4). Thus, the controller 310 may be arranged on a same side of the assembly as and aligned (along at least a portion of the controller 310) with the receiving cavity 308 and connector housing 214, as shown in FIG. 4.

As shown on a left side of the EMPD assembly 200 in FIGS. 3 and 4, another shaft seal 314 is arranged at a base housing end of the EMPD assembly 200 in order to seal the link shaft 208 within the base housing 204. The EMPD assembly 200 further includes a retaining ring 316, a ball bearing 318, and a spacer 320. The spacer 320 is arranged adjacent to an electromagnetic coil assembly 322, as shown in FIG. 4. The spacer 320 includes an axially extending annular portion 324 which mates with and fits into an annular slot (shown in FIG. 5A and discussed further below) depressed into an outer face of the electromagnetic coil assembly 322. An opposite end of the spacer 320 (opposite to the annular portion 324), which flares radially outward relative to a central axis 350 of the EMPD assembly 200 (as seen in FIG. 4), interfaces with the base housing 204. Specifically, grooves 319 arranged around a circumference of the spacer 320 are shaped to fit over corresponding extensions 321 on an interior surface of the base housing 204, allowing the spacer 320, and thus the electromagnetic coil assembly 322, to translate axially, in a direction of the central axis 350, but not rotate about the central axis 350.

The EMPD assembly 200 further includes a washer 326 and armature cam 328. The armature cam 328 includes an annular ring 332 with an outer face (facing the base housing end of the assembly) and an inner face (facing the end housing end of the assembly) and a plurality of bidirectional cam ramps 330 extending in an axial direction from the inner face (shown in FIG. 3). The outer face of the annular ring 332 is adapted to have face-sharing contact with a first face 323 of the electromagnetic coil assembly 322, which includes a friction material on the first face 323 (in the form of a friction disk, as explained further below), when the electromagnetic coil is energized and be spaced apart from the first face 323 via an air gap when the electromagnetic coil is de-energized (as shown in FIGS. 8A-8F, described further below). The bidirectional cam ramps 330 interface with a cam follower 334. Specifically, the cam follower 334 includes a plurality of elongate apertures 336 adapted to receive the plurality of bidirectional cam ramps 330, the elongate apertures 336 separated by a plurality of radially extending guides 338 of the cam follower 334.

As shown in FIG. 3, on either side of the cam follower 334 is a retaining ring 340 and shift spring 342. The shift spring 342 is arranged adjacent to a washer 344. The EMPD assembly 200 further includes a clutch ring 346. The clutch ring 346 is adapted to translate axially, along the central axis 350, responsive to axial movement of the cam follower 334, as explained further below. The clutch ring 346 includes an inner surface (relative to the central axis 350) including a first set of teeth 347 separated, in the axial direction, from a second set of teeth 348 via a space 349 (the space having no teeth). The first set of teeth 347 is adapted to interface (e.g., mate) with corresponding teeth 354 on the link shaft 208 in both the disengaged (4×2) position and the engaged (4×4) position of the assembly while the first set of teeth 347 additionally interface with corresponding first teeth 356 of the drive gear 358 in the engaged position. Additionally, in the engaged position, the second set of teeth 348 is adapted to interface (e.g., mate) with corresponding second teeth 357 on the drive gear 358. The drive gear 358 is adapted to connect to and drive another rotating component, such as an axle half shaft or shaft coupled to a drive wheel of a vehicle. In this way, by axially moving the clutch ring 346, the clutch ring may selectively connect and disconnect the link shaft 208 and the driver gear 358. For example, when the first set of teeth 347 of the clutch ring 346 is connected to the teeth 354 on the link shaft 208 and the first teeth 356 on the drive gear and the second set of teeth 348 is connected to the second teeth 357 on the drive gear 358, rotational motion may be transferred between the link shaft 208 and drive gear 358 (for example, an axle rotationally coupled with the link shaft 208 may drive a drive wheel rotationally coupled with the drive gear 358). FIG. 4 shows the disengaged (4×2) position of the clutch ring 346.

A clutch ring cage 352 is adapted to house (and thus contain within its interior) the cam follower 334, shift spring 342, washer 344, and clutch ring 346 (as shown in the assembled view of FIG. 4). A washer 360 fits around a smaller-diameter end 351 of the clutch ring cage 352 (as shown in FIG. 4). An inner shift fork 362 also fits around the smaller-diameter end 351 of the clutch ring cage 352, adjacent to the washer 360 (as seen in FIG. 4). The inner shift fork 362 includes a plurality of axial extensions 361, where one or more of the axial extensions 361 holds a corresponding magnet assembly 364, the magnet assembly including a magnet sled holding a magnet detectable via a sensor on the controller 310 in order to detect a position of the EMPD assembly 200 (e.g., 4×2, 4×4, or EOS, as explained further below). The axial extensions 361 extend over a larger-diameter end of the clutch ring cage 352. An outer shift fork 366 mates with the inner shift fork 362. For example, as shown in FIG. 4, a portion of the inner shift fork 362 extends over and surrounds at least a portion of the outer shift fork 366. The outer shift fork 366 holds a latching ring 368. As shown in FIG. 4, the latching ring 368 is arranged outside of, relative to the central axis 350, and surrounds a portion of the outer shift fork 366. The inner shift fork 362, outer shift fork 366, and latching ring 368 may move, axially, together with the clutch ring 346 and clutch ring cage 352.

As explained further below, the latching ring 368 is part of a latching system adapted to hold the clutch ring 346 in an engaged (4×4) position, where the clutch ring 346 is coupled to both the link shaft 208 and the drive gear 358, or a disengaged (4×2) position, where the clutch ring 346 is only coupled to the link shaft (and not the drive gear), after energizing the electromagnetic coil assembly to move the clutch ring into either the engaged or disengaged positions and after de-energizing the electromagnetic coil assembly. The latching ring 368 includes a first set of teeth 370 arranged on a first side of the latching ring 368 and having a first profile with a single, same-depth tooth pattern that repeats around a circumference of the latching ring 368 and a second set of teeth 372 arranged on an opposite, second side of the latching ring 368 and having a second profile with a different-depth tooth pattern having two different depth grooves that repeats around the circumference of the latching ring 368. The latching system further includes a guiding grooves cage 374 including a third set of teeth 376 adapted to interface with the first set of teeth 370 in a single position and the latching grooves cage 312 which includes a fourth set of teeth 378 adapted to interface with the second set of teeth 372 in two different locking positions. The guiding grooves cage 374 and latching grooves cage 312 couple to one another via a plurality of grooves, spaced apart from one another around a circumference of the guiding grooves cage 374, and a plurality of axially extending tabs, spaced apart from one another around a circumference of the latching grooves cage 374 (as shown in FIGS. 3 and 4, and described further below with reference to FIGS. 9A and 9B). The latching grooves cage 312 may be axially and rotationally fixed to the base housing 204 via one or more fixing elements 311 on the latching grooves cage 312 and mating fixing elements on an interior of the base housing 204. Additionally, the guiding grooves cage 374 is fixed to the latching grooves cage 312, and thus is also fixed in the axial and rotational directions (around the central axis 350). However, the latching ring 368 is free to move axially between the respective teeth of the guiding grooves cage 374 and latching grooves cage 312 and free to rotate around the central axis 350, as the assembly is shifted into the different positions, as described further below.

The EMPD assembly 200 further includes another retaining ring 380, a ball bearing 382, a cushion 384, a return spring 386, a roller bearing 388, another ball bearing 390, additional retaining rings 392 and 394, and the shaft seal 212. The cushion 384 may be made of a noise dampening material (such as a polymer) and thus, may be adapted to dampen the noise of the clutch ring 346 engaging with the drive gear 358. For example, the clutch ring 346 may move axially, in the direction of the central axis, toward the drive gear 358 (when moving from the disengaged to engaged position) with increased force that may result in noise when the clutch ring hits the drive gear. However, the cushion 384 reduces the noise of teeth of the clutch ring 346 engaging with the teeth of the drive gear 358. As shown in FIG. 4, the cushion 384 is arranged adjacent to the second teeth 357 of the drive gear 358. Thus, this positioning may prevent the clutch ring from impacting a side wall of the drive gear 358.

Now turning to FIGS. 5A-5E, more detailed views of the electromagnetic coil assembly (also referred to herein as the coil assembly) 322 are shown. Specifically, FIG. 5A shows a first end view of the coil assembly 322, FIG. 5B shows a first side view of the coil assembly 322, FIG. 5C shows a second end view of the coil assembly 322, FIG. 5D shows a cross-sectional side view of the coil assembly 322, and FIG. 5E shows a top view of the coil assembly 322.

The coil assembly 322 includes an annular housing 500 housing an electromagnetic coil 502 and a coil holder 504 adapted to hold four separate coils (e.g., coil springs) 506. The annular housing 500 includes a first end 508 (shown in FIG. 5C) and second end 510 (shown in FIG. 5A), where the coil holder 504 is arranged at and across a portion of the second end 510. Legs 512 of the coil holder 504 extend across a top and bottom of the annular housing 500, from the second end 510 and toward the first end 508. As shown in FIGS. 5A and 5C, there are four legs 512, each housing one of the coils 506. Each coil (e.g., coil spring) 506 is fastened to a corresponding leg 512 via a rivet 514 (e.g., via soldering, in one embodiment). A portion of the legs 512 are electrically coupled to the internal electromagnetic coil 502 via a respective electrical conductor (e.g., a copper circuit, in one embodiment) 516. In one embodiment, only two of the coils 506 (of only two of the legs) are connected to an electrical conductor 516. For example, as shown in FIG. 5E, only the top two coils (e.g., the coils arranged at the top, or one side, of the coil holder 504), including first coil 530 and second coil 532, include an electrical conductor 516 in contact with the coils within the corresponding legs 512 while the other two coils (bottom coils, including third coil 534 and fourth coil 536) are not directly coupled to an electrical conductor and thus are not electrically coupled to the internal coil 502.

In this way, the top two coils 530 and 532, coupled to the electrical conductors 516, serve as electrical terminals of the coil assembly 322. In one example, the top two legs shown in FIG. 5E may be referred to as the contact assembly of the coil assembly 322, where the contact assembly is adapted to be electrically coupled with the controller (e.g., controller 310 shown in FIGS. 3 and 4). As such, each of the coil 530 and 532 within the top two legs is electrically coupled to the electromagnetic coil 502 and a corresponding controller terminal of the controller. For example, the coil 530 within a first of the top two legs may be the positive electrical connection to the electromagnetic coil 502 and the coil 532 within a second of the top two legs may be the electrical ground of the electromagnetic coil 502. Said another way, a controller terminal mates with and directly connects to each of the coils of the top two legs. In one example, the controller terminals may be electrically coupled to each of coils 530 and 532 through the respective rivets 514 directly coupled to the coils. As a result, the controller may send electrical impulses, through controller terminals, to the first and second coils 530 and 532, to electrically energize and de-energize the electromagnetic coil 502.

Together, all four of the coils 530, 532, 534, and 536 of the three four legs serve as coil return springs of the coil assembly 322. For example, as described further below, upon energizing the electromagnetic coil 502, the coil assembly 322 may translate axially toward and into contact with the metal armature cam (due to the magnetic attraction cause by energizing the coil 502). However, upon de-energization of the electromagnetic coil 502, the spring force of the compressed coils 530, 532, 534, and 536 may push the coil assembly 322 backwards, in the axial direction, and away from the armature cam. The four individual coils 506 of the four individual legs 512 provide a balanced return force to the coil assembly 322 due to the distribution of the legs 512 around a circumference of the coil assembly 322. For example, while the top two legs provide electrical connections and spring return forces, the bottom two legs provide additional spring forces to balance the force of the coils in the top two legs. In this way, the four legs shown in FIGS. 5A-5E provide both a return spring force and electrical connection to the coil assembly 322. Specifically, the top two legs includes coils 530 and 532 integrate both the coil electrical connections (e.g., terminals) and coil return springs into one part. While four legs are shown in FIGS. 5A-5E, in alternate embodiments, the coil assembly 322 may include more or less non-electrically coupled legs for balancing of the coil return spring force.

As shown in FIGS. 5C and 5D, the first end 508 of the annular housing 500 includes a first face having a friction disk 518. The friction disk 518 is annular and includes a friction material arranged therein. The friction disk 518 is adapted to have face-sharing contact with the outer face of the armature cam when the electromagnetic coil is energized, as discussed further below with reference to FIGS. 8A-8F. The second end 510 of the annular housing 500 has a second face arranged opposite to the first face, the second face having an annular slot 520 depressed inward into the second face. As shown in FIG. 5A, the annular slot 520 further includes a plurality of spaced apart radial extensions of the slot. As discussed above, the annular slot 520 is shaped to receive and couple to the axially extending annular portion 324 of the spacer 320. Additionally, as shown in FIG. 5D, the annular housing 500 includes an iron core 522 and the electromagnetic coil 502 arranged within the iron core 522. The electromagnetic coil 502 (and not coils 506) create a magnetic field for creating the magnetic attraction between the armature cam and electromagnetic coil assembly.

Turning to FIGS. 6A-6B, detailed views of the armature cam 328 are shown. Specifically, FIG. 6A shows an isometric view of a first side of the armature cam 328 and FIG. 6B shows an isometric view of a second side of the armature cam 328. As introduced above with reference to FIG. 3, the armature cam 328 includes an annular ring 332 with a first (also referred to herein as outer) face 602 and a second (also referred to herein as inner) face 604 and a plurality of bidirectional cam ramps 330 extending outward, in an axial direction (relative to central axis 350) from the second face 604. The first face 602 and second face 604 are planar and arranged parallel to one another and normal to the central axis 350. The annular ring 332 has an inner diameter 606, an overall thickness 608, and outermost diameter 610. The first face 602 is adapted to have face-sharing contact with the planar, friction disk 518 of the coil assembly 322, as described further below, when the electromagnetic coil is energized.

As shown in FIGS. 6A-6B, there are three bidirectional cam ramps 330 spaced apart from one another around a circumference of the armature cam 328. Each bidirectional camp ramp 330 is connected to an adjacent bidirectional camp ramp 330 via a connecting platform 612. However, adjacent bidirectional cam ramps 330 are not directly coupled to one another (e.g., a connecting platform 612 separates adjacent bidirectional cam ramps 330 from one another). Each connecting platform 612 is directly coupled to the second face 604 and includes an aperture 614 arranged through a center portion of the platform 612. In one example, the connecting platforms 612 are integrated together, as one piece, with the annular ring 332. In another example, the connecting platforms 612 are welded to the annular ring 332 or fastened to the annular ring 332 via the apertures 614. Each connecting platform 612 spans radially across a width of the second face 604 (from the inner diameter to an innermost outer diameter 616) and has a length (e.g., arc length) 624, in a circumferential direction around a circumference of the annular ring 332, each length 624 smaller than a length (e.g., arc length) 626 separating adjacent connecting platforms 612. Each bidirectional cam ramp 330 includes a first ramp 618 and a second ramp 620 that meet at an apex 622, the apex 622 positioned away from the inner face of the annular ring of the armature cam and being an outermost extending portion of the bidirectional camp ramp. The first ramp 618 extends outward from a first connecting platform to the apex 622 and the second ramp 620 extends outward from a different, second connecting platform to the apex 622, the first and second connecting platforms spaced apart from one another.

FIG. 7 shows a detailed view of the cam follower 334. As introduced above with reference to FIG. 3, the cam follower 334 includes a plurality of elongate apertures 336 adapted to receive the plurality of bidirectional cam ramps 330, the elongate apertures 336 separated by a plurality of radially extending guides 338 of the cam follower. As shown in FIG. 7, the cam follower 334 includes an outer annular ring 702 and an inner annular ring 704 coupled together via the radially extending guides 338. Specifically, each of the radially extending guides 338 extend in a radial direction (perpendicular to the central axis 350) between the outer annular ring 702 and the inner annular ring 704. The radially extending guides 338 are arranged around a circumference of the cam follower 334 and spaced apart from one another via the elongate apertures 336. The elongate apertures 336 extend through an entire thickness (in the axial direction) of the cam follower 334. As shown in FIG. 7, there are three radially extending guides 338 and three elongate apertures 336 which match the number (3) of bidirectional ramps of the armature cam 328. A length (e.g., arc length) 706 of each of the plurality of elongate apertures, in a direction of a circumference of the inner and outer annular rings, is longer than a length 708 of each of the plurality of radially extending guides, in the direction of the circumference of the inner and outer annular rings. An interface between each elongate aperture 336 and adjacent guide 338 includes a depressed sidewall portion 714 that angles into the elongate aperture from the guide, the depressed sidewall portion adapted to receive and interface with an apex 622 of the armature cam 328 (e.g., when the assembly is shifted to the 4×4 position).

Additionally, the inner annular ring 704 includes a plurality of teeth 710 arranged around a circumference of an inner surface of the inner annular ring 704 which may mate with the teeth 354 of the link shaft 208. Thus, the cam follower 334 may rotate along with rotation of the link shaft 208. The outer annular ring 702 includes a plurality of radial protrusions 712 extending radially outward, relative to the central axis 350, from the outer annular ring 702 and which are spaced apart from one another around the circumference of the outer annular ring 702.

The EMPD assembly 200 described herein may adjust the clutch ring 346 into a 4×4 (e.g., engaged) position wherein two rotating components (e.g., axles or shafts of a vehicle powertrain) are rotationally coupled to one another and into a 4×2 (e.g., disengaged) position wherein two rotating components are not rotationally coupled to one another. The first rotating component may be the link shaft 208, which may be rotationally coupled to another axle or shaft of a vehicle (or another component) and the second rotating component may be the drive gear 358 which may be rotationally coupled (and drive) another axle or shaft of the vehicle.

FIGS. 8A-8F show assembled end and top views of a coil and cam assembly 800 of the EMPD assembly 200 in different positions including the 4×2 (e.g., retracted) position, the 4×4 (e.g., partially extended) position, and the end-of-shift (also referred to as end-of-travel), EOS, (e.g., fully extended) position. The coil and cam assembly 800 includes electromagnetic coil assembly 322, cam follower 334, and armature cam 328. More specifically, FIG. 8A shows a first end view 802 of a coil and cam assembly 800 of the EMPD assembly 200 in a retracted position (clutch ring is in 4×2 position), FIG. 8B shows a second end view 806 of the coil and cam assembly 800 in a partially extended position (clutch ring is in 4×4 position), FIG. 8C shows a third end view 810 of the coil and cam assembly 800 in a fully extended position (clutch ring is in the EOS position), FIG. 8D shows a first top view 804 of the coil and cam assembly 800 in the retracted position, FIG. 8E shows a second top view 808 of the coil and cam assembly 800 in the partially extended position, and FIG. 8F shows a third top view 812 of the coil and cam assembly 800 in the fully extended position. Additionally, FIGS. 10A and 11A show an external view of the clutch ring 346 in the 4×2 and 4×4 positions, respectively and FIGS. 10C, 11C, and 12A show cross-sectional views of the EMPD assembly 200 in the 4×2, 4×4, and EOS positions, respectively. The description that follows regarding the shifting of the EMPD assembly 200 may refer to each of FIGS. 8A-8F, 10A, 10C, 11A, 11C, and 12A. Components of the EMPD assembly 200 shown in FIGS. 8A-8F, 10A, 10C, 11A, 11C, and 12A may be the same as components shown in FIGS. 2-7, as described above. As such, these components are similarly numbered and may not be re-introduced below with reference to FIGS. 8A-8F. The central axis 350 is shown for reference (it extends into the page, as shown by the X, in FIGS. 8A-8C). In one embodiment, the 4×2 and 4×4 positions may correspond to shifting modes of the vehicle, wherein a shift command may be sent to a vehicle controller, which may in turn be sent to the disconnect controller 310 in order to actuate EMPD assembly 200 accordingly. For example, during operation, the controller 310 may send electrical actuation signals to the electromagnetic coil assembly 322 in order to energize and de-energize the electromagnetic coil 502 within the electromagnetic coil assembly 322. In response to these signals, the coil and cam assembly 800 may move as discussed further below with reference to FIGS. 8A-8F, 10A, 10C, 11A, 11C, and 12A.

As seen in FIGS. 8A and 8D, the coil and cam assembly 800 is in the retracted position, which may correspond to the clutch ring and EMPD assembly 200 being in the 4×2 position. As shown in FIGS. 10A and 10C, in the 4×2 position, the clutch ring 346 is only engaged with one rotating component (e.g., the link shaft 208) while another rotating component (e.g., the drive gear 358 which may be coupled to another axle or shaft of the vehicle) is allowed to rotate independently. As shown in FIG. 8D, in the 4×2 position, the coil assembly 322 and the armature cam 328 are separated from one another by an air gap 814. Additionally, each bidirectional cam ramp 330 is extending through a corresponding one of the elongate apertures 336 and each radially extending guide 338 is positioned against (e.g., in face-sharing contact with) a corresponding one of the connecting platforms 612 (as shown in FIGS. 8D and 10C). As such, the cam follower 334 is positioned against the armature cam 328, and thus, is in the retracted position. Since the cam follower 334 is coupled to the link shaft 208 (via teeth 710), the cam follower rotates along with the link shaft 208. Additionally, the armature cam 328 rotates along with the cam follower 334 due to the interfacing elongate apertures 336 and bidirectional ramps 330. As seen in FIG. 8A, the apex 622 of each bidirectional ramp 330 is approximately centered between two adjacent radially extending guides 338.

When a shift from the 4×2 to the 4×4 mode is commanded, the vehicle controller provides electric current to the electromagnetic coil of the electromagnetic coil assembly 322 via the spring coils coupled to the electrical conductors, as described above with reference to FIGS. 5A-5E, in order to energize the electromagnetic coil 502 of the coil assembly 322. According to the properties of electromagnetism, energizing the electromagnetic coil 502 may create a magnetic field surrounding the coil. As such, the coil assembly 322 is attracted to the armature cam 328, which is composed of a suitable metallic material for interaction with the magnetic field produced by the coil assembly 322. While the coil assembly 322 is fixed from rotating, armature cam 328 rotates with the cam follower 334, as described above. Since the coil assembly 322 is free to translate a limited amount, in the axial direction (along central axis 350), the coil assembly 322 moves, in the positive axial direction 820 (shown in FIG. 8E), toward and into contact with the annular ring 332 of the armature cam 328 while the armature cam 328 remains stationary in the axial direction. This movement of the coil assembly 322 to the armature cam 328 effectively closes the air gap 814 and thereby creates friction between the coil assembly 322 and the first face 602 of the annular ring 332 of the armature cam 328. The friction disk 518 on the coil assembly 322 increases this friction between the coil assembly 322 and the annular ring 332 and reduces wear. In response to the coil assembly 322 contacting the armature cam 328, rotation of the armature cam 328 may be slowed or stopped. When the armature cam 328 is rotating slower than the cam follower 334, the bidirectional ramps 330 of the armature cam 328 produce a force against the radially extending guides 338 of the cam follower 334. As a result, as shown in FIGS. 8B and 8E, the radially extending guides 338 of the cam follower 334 slide partially along the bidirectional ramps 330 of the armature cam 328, away from the connecting platforms 612 (e.g., the connecting platforms are visible in FIG. 8B whereas they were covered by the guides in FIG. 8A) and toward the apexes 622 of the bidirectional ramps 330. This causes the cam follower 334 to move away from the annular ring 332 of the armature cam 328 (while the armature cam 328 remains stationary is the axial direction), in the positive axial direction 820. Axial movement of the cam follower 334, in the positive axial direction 820, causes axial movement of the clutch ring 346 (in the same direction) via shift spring 342. In this way, the actuation force provided by the energized coil of the coil assembly 322 and armature cam 328 may force the clutch ring 346 in the positive axial direction 820 and into engagement with the drive gear 358, as shown in FIGS. 11A and 11C, and a second rotating component coupled with the drive gear. The axial motion of the cam follower 334 subsequently acts on the clutch ring 346 to produce a shift from the disengaged to the engaged position, thereby shifting from the 4×2 to the 4×4 position. As shown in FIGS. 8B and 8E, when the coil and cam assembly 800 is in the partially extended position the cam follower is part way, in the axial direction, from the annular ring 332 of the armature cam 328. In this position shown in FIGS. 8B and 8E, the apexes 622 are arranged partway between adjacent radially extending guides 338. However, when shifting between the 4×2 and 4×4 positions, the assembly is first shifted from the current position to the EOS position and then the assembly settles into the desired position after the coil is de-energized. As shown in FIGS. 8C, 8F, and 12A, in the EOS position, the cam follower 334 is in the fully extended position so that it is the farthest away as possible from the annular ring 332 of the armature cam 328. In this EOS position, the clutch ring 346 is shifted past, in the axial direction, the 4×4 position (as seen in FIG. 12A).

As described above and further below with reference to FIGS. 9A-9B, the EMPD assembly 200 includes a latching system 900 for holding the clutch ring 346 of the EMPD assembly 200 in the 4×4 position without requiring the coil of the coil assembly 322 to stay energized. For example, it is advantageous to only energize the coil when shifting from one position to another. However, if the latching system is not included in the EMPD assembly 200, de-energizing the coil of the coil assembly 322 would result in the armature cam 328 being free to rotate along with the cam follower 334 and the return spring 386 then returns the clutch ring 346 to the 4×2 position (by translating the clutch ring 346 in the negative axial direction). Instead, when the 4×4 position in commanded, the coil of the coil assembly 322 is energized and the clutch ring 346 is shifted into the 4×4 position, as described above. In addition to this motion, the latching system 900 holds the EMPD assembly 200 in the 4×4 position, even after the coil of the coil assembly 322 is de-energized. In this state, the vehicle will stay in the 4×4 mode until the 4×2 mode is selected.

When a shift from the 4×4 to the 4×2 mode is commanded, the controller 310 again provides electric current to the electromagnetic coil 502 of the coil assembly, as described above, in order to energize the coil 502. As a result, the guides 338 of the cam follower 334 travel further up the bidirectional ramps 330 of the armature cam 328 until the sidewall portions 714 of the guides 338 come into contact with the apexes 622 of the bidirectional ramps 330. As explained above, this position is referred to as the EOS position and is shown in FIGS. 8C, 8F, and 12A. The additional travel distance causes the latching system to switch positions, as described further below with reference to FIGS. 9, 10B, 11B, and 12B. Once the latching system has switched positions, the coil of the coil assembly 322 may be de-energized. When the coil is de-energized from the EOS position, the coil assembly 322 moves away from the armature cam 328 and the air gap 814 is again present between the coil assembly 322 and the armature cam 328. The armature cam 328 and cam follower 334 are then free to rotate along with the link shaft 208 and the return spring 386 returns the clutch ring 346 to the 4×2 position. The vehicle drive mode may cycle between the 4×2 and 4×4 position, stopping first in the EOS position, every time the electromagnetic coil of the coil assembly 322 is energized for a brief duration or pulsed.

As described above, the latching system holds the EMPD assembly 200 in the selected shift position without requiring the electromagnetic coil to remain energized. In this way, the electromagnetic coil may only be energized when moving from one shift position to another. The latching system 900 employed in the EMPD assembly 200 is shown in more detail in FIGS. 9A and 9B. Specifically, FIGS. 9A-9B show components of the latching system 900 of the EMPD assembly 200, including the latching grooves cage 312 and the guiding grooves cage 374 shown in FIG. 9A and the latching ring 368 shown in FIG. 9B. As explained above and as shown in FIG. 9B, the latching ring 368 includes the first set of teeth 370 arranged on a first side of the latching ring and having a first profile with a single depth 902 that is the same for each tooth and that repeats around a circumference of the latching ring 368. In this way, the single tooth profile with depth 902 repeats continuously around the entire circumference of the latching ring 368 to make up the first set of teeth 370. The latching ring 368 includes the second set of teeth 372 arranged on an opposite, second side of the latching ring 368, the second set of teeth 372 and having a second profile with a different-depth tooth pattern having two different depths that repeats around the circumference of the latching ring 368. For example, as shown in FIG. 9B, the second set of teeth 372 are formed by repeating teeth (repeated continuously around an entire circumference of the latching ring) having a longer, first depth 904 and a shorter, second depth 906. Each tooth of the second set of teeth 372 is formed by two higher peaks 908 and 910 arranged adjacent to one another and two deeper grooves 912 on either side of the peaks 908 and 910. The two peaks 908 and 910 are separated from one another by a shallower groove 914. The first set of teeth and second set of teeth are separated from one another, on opposite sides of the latching ring relative to the central axis 350, and do not overlap with one another.

Figure 11B:
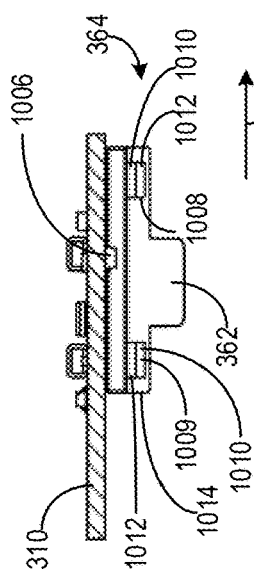
FIGS. 11A-11D show different assembly views of the electromagnetic pulse disconnect assembly in a 4×4 position.
Figure 11D:
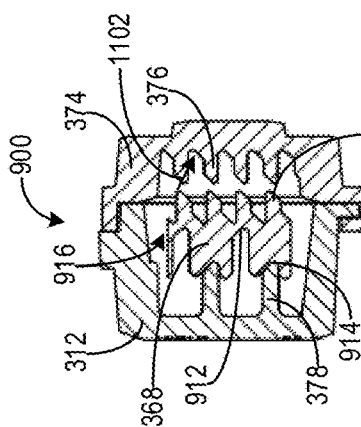
Figure 11A:
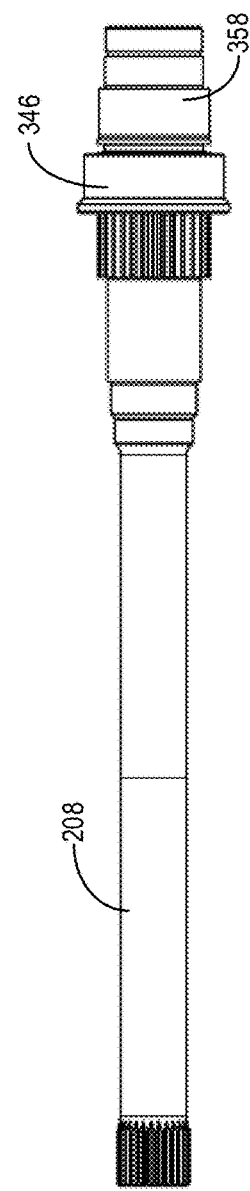
Figure 11C:
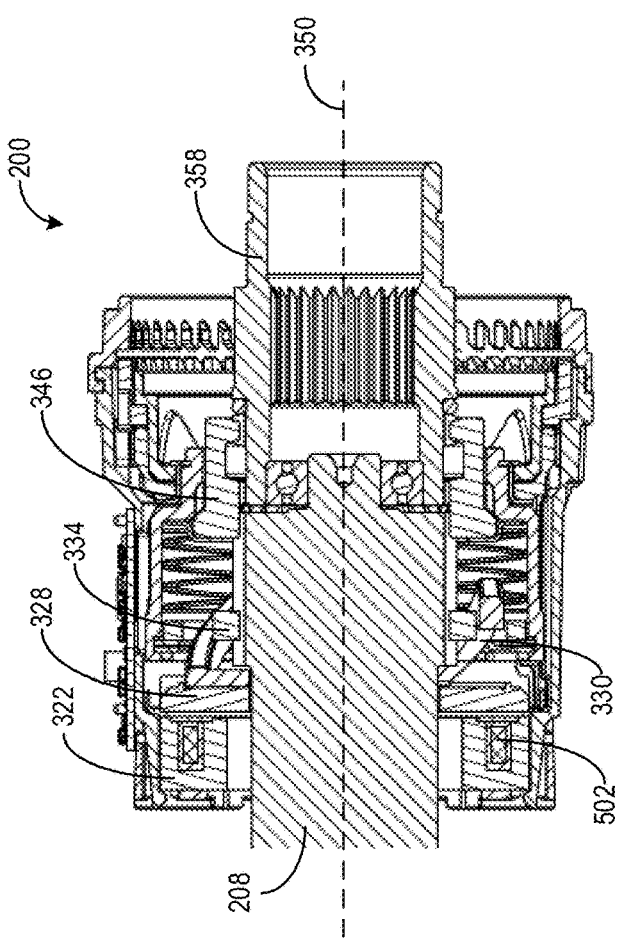

The latching ring 368 is positioned inside the latching grooves cage 312 and the guiding grooves cage 374, in a space 916 formed between the third set of teeth 376 of the guiding grooves cage 374 and the fourth set of teeth 378 of the latching grooves cage 312, as shown in FIGS. 10B, 11B, and 12B. As shown in FIGS. 10B, 11B, and 12B, the third set of teeth 376 are shaped to interface with the first set of teeth 370 in only a single position (e.g., each tooth of the first set of teeth 370 fits in a groove formed between adjacent pairs of the third set of teeth 376) and the fourth set of teeth 378 are shaped to interface with the second set of teeth 372 in two different locking positions (e.g., each tooth of the fourth set of teeth 378 fit in either the deeper groove 912 or the shallower groove 914 formed by the second set of teeth 372). As shown in FIG. 9A, the guiding grooves cage 374 and latching grooves cage 312 couple to one another, at outer walls 924 and 926 via a plurality of axially extending tabs 918, spaced apart from one another around a circumference of the guiding grooves cage 374. The third set of teeth 376 are formed on an inner wall 930 of the guiding grooves cage 374 and extend in an axial direction, relative to the central axis 350, toward the latching grooves cage 312 and the fourth set of teeth 378 are formed on an inner wall 928 of the latching grooves cage 312 and extend in the axial direction toward to guiding grooves cage 374, where the space 916 is formed between ends of the third set of teeth 376 and the fourth set of teeth 378.

The latching grooves cage 312 includes a window 920 (e.g., aperture) that aligns with the controller 310 positioned outside of the latching grooves cage 312 (relative to the central axis 350), as shown in FIG. 4. As a result, a sensor on the controller may detect the passing magnet assembly 364 arranged on the inner shift fork 362, the inner shift fork arranged within an interior of the latching grooves cage 312 (see FIG. 4). Also shown in FIG. 9A, the latching grooves cage 312 includes tabs 922 for limiting axial movement (in the negative axial direction, toward the end of the latching grooves cage 312 including the tabs 922) of components of the EMPD assembly 200 arranged inside the latching grooves cage 312, such as the coil assembly 322 (as shown in FIG. 4).

As explained above, the latching grooves cage 312 and guiding grooves cage 374 are both axially and rotationally fixed. Thus, they do no translate axially along the central axis 350 or relative to one another. However, the latching ring 368 may move axially between the fourth set of teeth 378 and the third set of teeth 376 and the latching ring 368 may rotate, around the central axis 350, when moving back and forth between the respective teeth of the latching grooves cage 312 and the guiding grooves cage 374. However, the latching ring 368 is never coupled to both the third set of teeth 376 and fourth set of teeth 378 at once. The movement of the latching ring 368 during shifting of the EMPD assembly 200 is described below with reference to FIGS. 10B, 11B, and 12B.

FIGS. 10B, 11B, and 12B show a cross-sectional view of the latching system 900 described above in the 4×2, 4×4, and EOS positions, respectively. In particular, FIGS. 10B, 11B, and 12B show how the latching ring 368 is coupled, in different positions, with the latching grooves cage 312 in the 4×2 and 4×4 positions and how the latching ring moves to the guiding grooves cage 374 in the EOS position.

As seen in FIG. 10B, when the EMPD assembly 200 is in the 4×2 position, the deeper grooves 912 of the latching ring 368 and engaged with (e.g., in mating contact with) and receive the fourth set of teeth 378 of the latching grooves cage 312. In this position, the latching ring 368 is moved away from the guiding grooves cage 374 and only coupled with the latching grooves cage 312. Further, in this position, the latching system 900 maintains the clutch ring in the 4×2 position, even after the electromagnetic coil is de-energized.

When a command to shift the clutch ring to the 4×4 position is received, the electromagnetic coil of the EMPD assembly 200 is again energized, as discussed above, to move the clutch ring into engagement with both the drive gear and link shaft. As discussed above with reference to FIGS. 3 and 4, the latching ring 368 moves axially, together with the clutch ring 346 and clutch ring cage. Thus, as the clutch ring moves axially to be engaged with the drive gear, the latching ring also moves in the positive axial direction 820 (as shown in FIG. 10B), while the guiding grooves cage 374 and latching grooves cage 312 remain stationary in the axial direction. Specifically, the latching ring moves axially, away from the teeth 378 of the latching grooves cage 312 and toward the guiding grooves cage 374. The first set of teeth 370 of the latching ring 368 hit a peak of the third set of teeth 376 and the guiding grooves cage 374 cause the latching ring 368 to rotate slightly, around the central axis 350, to slide the first set of teeth 370 into engagement with the grooves of the third set of teeth 376. The sliding movement of the first set of teeth 370 are depicted by arrow 1002 in FIG. 10B. In this way, the guiding grooves cage 374 index the latching ring 368 one notch (e.g., by one groove of the teeth) in the rotational direction around the central axis 350. FIG. 12B shows the EOS position where the first set of teeth 370 of the latching ring 368 are engaged with the third set of teeth 376 of the guiding grooves cage 374.

In response to reaching the EOS position, the electromagnetic coil may be de-energized. Upon de-energization of the electromagnetic coil, the clutch ring and latching ring 368 may move in the negative axial direction 1202 (as shown in FIG. 12B). The latching ring 368 moves in the negative axial direction 1202 and the higher peaks of the second set of teeth 372, due to their angling and the angling of the fourth set of teeth 378 of the latching grooves cage 312, slide along the peaks of the fourth set of teeth 378, in the direction shown by arrow 1204 in FIG. 12B, so that the shallower grooves 914 are engaged with the peaks of the fourth set of teeth 378, as shown in FIG. 11B. By indexing the latching ring 368 by one notch, such that it rotates by one groove of the latching ring, in the EOS position, when the latching ring 368 travels axially back to the latching grooves cage, the latching ring 368 has shifted its rotational position relative to the latching grooves cage 312, thereby allowing the shallower grooves 914 to be in alignment and engage with the peaks of the fourth set of teeth 378. In this position, the latching system 900 holds the EMPD assembly in the 4×4 position, without the electromagnetic coil having to remain energized.

This process is repeated when transitioning (e.g., shifting) from the 4×4 position to the 4×2 position. Specifically, the latching ring 368 moves in the positive axial direction 820, as shown in FIG. 11B, from the 4×4 position to the EOS position (shown in FIG. 12B). The latching ring 368 again rotates by one notch (or groove) as it slides it engagements with the teeth of the guiding grooves cage 374. Then, when the electromagnetic coil is de-energized, the latching ring 368 translates back to the latching grooves cage 312 and now the deeper grooves 912 slide into engagement with the teeth 378 of the latching grooves cage 312. In this way, the latching ring 368 rotates and advances one notch, or groove, in one direction, as it alternates between shallower grooves 914 and deeper grooves 912 each time a mode shift is made. Each time a shift is requested from the 4×2 to 4×4 position or from the 4×4 position to the 4×2 position, the latching system 900 first shifts to the EOS position in order to rotate the latching ring 368 and alternate the alignment of the deeper/shallower grooves with the teeth of the latching grooves cage.

Turning now to FIGS. 10D, 11D, and 12C, views of the magnet assembly 364 in the 4×2, 4×4, and EOS shift positions, respectively, are shown. As discussed above, the magnet assembly 364 may be included on an exterior portion of the inner shift fork 362. FIGS. 10D, 11D, and 12C show the magnet assembly 364, which includes a magnet holder (e.g., sled) 1014 coupled to the inner shift fork 362. The magnet assembly 364 includes two magnets 1008 and 1009 spaced apart from one another and positioned at opposite ends of the magnet holder 1014. Each magnet includes a north pole 1010 and a south pole 1012, where the positioning of the north pole 1010 and south pole 1012 portions of each magnet is opposite one another. For example, as shown in FIGS. 10D, 11D, and 12C, the leftmost, second magnet 1009 has the south pole 1012 on top (closer to the radial position of the sensor 1006) while the rightmost, first magnet 1008 has the south pole 1012 on bottom (farther from the radial position of the sensor 1006). The magnets 1008 and 1009 are detectable via a sensor 1006 arranged on an inner surface, relative to the central axis 350, of the controller 310.

The axial position of the magnets 1008 and 1009 of the magnet assembly 364 correspond to the axial position of the latching ring 368 and the clutch ring 346 since the inner shift fork 362 moves axially together with the outer shift fork 366, latching ring 368, clutch ring 346, and clutch ring cage 352, as explained above. Thus, the axial position of the magnets 1008 and 1009 may correlate to the shift position (4×2, 4×4, or EOS) of the EMPD assembly 200. FIGS. 10A-10D show the EMPD assembly 200 in the 4×2 position where the clutch ring is not engaged with the drive gear, and thus, the clutch ring 346 and latching ring 368 are in the furthest negative axial position out of all the shift positions (e.g., furthest to the left in FIGS. 10A-10B and closest to the base housing end of the assembly). As a result, as shown in FIG. 10B, the first magnet 1008 is positioned at a same axial position, relative to central axis 350 and as depicted by arrow 1016, the sensor 1006, while the second magnet 1009 is positioned away from the sensor 1006, in the axial direction. The sensor 1006 may sense the north pole 1010 of the first magnet 1008, and in response, the controller 310 may determine the EMPD assembly 200 is in the 4×2 position.

In contrast, in the 4×4 position, as shown in FIG. 11D, since the assembly has moved in the positive axial direction, as shown by arrow 1016, relative to the 4×2 position, the axial position of the sensor 1006 is now arranged between the first magnet 1008 and second magnet 1009. Thus, the sensor 1006 is not axially aligned with either of the magnets 1008 and 1009. In this position, the sensor 1006 may not detect either of the magnets 1008 and 1009. In response to this signal from the sensor 1006, the controller 310 determines that the EMPD assembly 200 is in the 4×4 position.

As shown in FIG. 12C, the assembly has moved even further in the positive axial direction, relative to each of the 4×2 and 4×4 positions, to the EOS position. As a result, the axial position of the sensor 1006 is now closer to the second magnet 1009 and positioned away from the first magnet 1008. In this position, the sensor 1006 detects the south pole 1012 of the second magnet 1009, and in response, the controller 310 may determine the EMPD assembly 200 is in the 4×4 position.

FIGS. 1-12C show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred to as such, in one example.

FIGS. 13A-13B depict a method 1300 for operating the EMPD assembly 200 discussed above. It is noted that the various steps and decision-making processes may be stored in the memory of a main vehicle controller external to the EMPD assembly 200. In other examples, a localized hub controller may be coupled directly to EMPD assembly 200 and execute the steps of method 1300 while communicating with the external, main vehicle controller. In yet another example, the various steps and decision-making processes of method 1300 may be stored in a memory of the EMPD assembly controller (such as controller 310 shown in FIGS. 3, 4, 10D, 11D, and 12C). As such, the EMPD assembly controller may execute method 1300 in combination with the various sensors (e.g., position sensor 1006) and actuators (e.g., contact assembly coil electromagnetic coil assembly 322) of the EMPD assembly. To reiterate, the 4×2 (2WD) or first mode corresponds to the first position where clutch ring 346 engages only one rotating component (e.g., link shaft 208) while the 4×4 (4WD) or second mode corresponds to the second position where clutch ring 346 engages both rotating components (e.g., the link shaft 208 and drive gear 358 coupled with another shaft or axle), thereby coupling the two rotating components together. Lastly, the end-of-shift (EOS) position corresponds to where the clutch ring 346 and other attached components are farthest shifted in the axial direction when the electromagnetic coil 502 is energized. This can be seen FIGS. 12A-12C, where the EOS position is the rightmost position compared to the 4×2 and 4×4 positions. For ease of understanding, reference will be made to components and description presented with regards to the previous figures. However, method 1300 may be employed in alternate EMPD assemblies having different configurations than described above.

First, referring to FIG. 13A, at 1301 the method includes performing a series of initialization operations. The initialization operations may include calibrating the position sensor (e.g., position sensor 1006) so magnetic force (e.g., sensing north pole, smaller magnetic force or magnetic forces of both magnets, or south pole) of the magnet assembly may be correlated to the 4×2, 4×4, or EOS positions, determining direction of travel of the vehicle, and synchronizing the rotational speed of the two rotating components (e.g., the two rotating components that may be selectively and rotatably coupled via the clutch ring of the disconnect). Next, at 1302, an operator (i.e. driver) or other system may be send an input command to the controller or similar device. The input command may be a request to shift from the 4×4 mode to the 4×2 mode or vice versa. As such, the method at 1302 may include receiving and reading the input command from the controller. Upon receiving the shift command, at 1303 the method includes determining which shift mode has been commanded (i.e. requested) by the vehicle operator. If 4×2 operation is requested, then the method continues at 1313 in FIG. 13B. Alternatively, if 4×4 operation is requested, then the method continues at 1304 in FIG. 13A.

At 1304, the method includes determining if the EMPD assembly 200 is in the 4×4 (second) position, that is, when clutch ring 346 along with the other components that translate axially with clutch ring 346 are in the 4×4 position, thereby coupling the two rotating components together. At step 1304 and the other steps of method 1300 where it is determined whether the EMPD assembly 200 is in a certain position (e.g., 4×4, 4×2, or EOS), the controller may determine this based on an output of a position sensor (e.g., position sensor 1006), as described above with reference to FIGS. 10D, 11D, and 12C. If the EMPD assembly 200 is already in the 4×4 position, then at 1312 the method includes outputting a 4×4 feedback signal to the external vehicle controller to notify the operator and other system of the current 4×4 position. Alternatively, if at 1304 the EMPD assembly 200 is not the 4×4 position, then at 1305 an electrical current may be sent to energize the electromagnetic coil of coil assembly 322. As previously explained, with energizing the coil of coil assembly 322, the clutch and latching ring assemblies may move in the positive axial direction. Next, at 1306, the sensor 1006 may detect if EMPD assembly 200 is at the EOS position, as discussed above. The controller may determine the EMPD assembly 200 is in the EOS position in response to the sensor 1006 detecting a south pole magnetic force (from second magnet 1009). If the EMPD assembly 200 has not yet reached the EOS position, then at 1307 a timer or other device may determine if a maximum allowable time for energizing the coil of the coil assembly 322 has passed. In one example, the maximum allowable time for pulsing the coil of the coil assembly 322 may aid in reducing degradation of the coil 502 and armature cam 328. If the maximum allowable time has not expired, then the method at 1306 may be repeated to continually check if the EMPD assembly 200 has reached the EOS position. Conversely, if the maximum allowable time has expired, then at 1308 current may stop flowing to coil of the coil assembly 322, thereby de-energizing the coil 502. Furthermore, a cooling period may be initiated to allow the coil 502 to cool off before proceeding back to 1306.

At 1306, once the EOS position has been reached, then at 1309 the coil 502 of coil assembly 322 may be de-energized. Upon de-energizing the coil 502, the clutch and latching ring assemblies move axially towards the 4×4 position and corresponding latching grooves. While this motion is occurring, at 1310 the sensor 1006 may monitor the position of the EMPD assembly 200. In one example, the sensor 1006 may continuously output a signal corresponding to the magnetic force detected by the sensor 1006. At 1311, the method includes determining if the EMPD assembly 200 is in the 4×4 position. If the 4×4 position has not yet been reached, then the process continues to 1322 to determine of a threshold (e.g., maximum) number of shift attempts has been exceeded. If the threshold number of shift attempts has been exceeded, the process ends. Since method 1300 may repeat continuously, the method may restart at 1302 instead of 1301 during a single drive cycle. If the threshold number of shift attempts has not been exceeded, the method loops back to 1304 to determine if the EMPD is in the 4×4 position. Conversely at 1311, if the controller 310, via the output signal of sensor 1006, determines that the EMPD assembly 200 is in the 4×4 position, then at 1312 the method includes outputting a 4×4 feedback signal to the vehicle controller and/or vehicle operator, thereby ending method 1300.

At 1303, if 4×2 operation is requested, then method 1300 proceeds in FIG. 13B. The methods at 813-823 of FIG. 13B may be similar to methods 804-812 of FIG. 13A, while FIG. 13B focuses on shifting to the 4×2 position. As such, for the sake of brevity, brief descriptions of each of the methods at 813-821 will be presented while the description above for FIG. 13A may be referenced for more thorough descriptions. Referring to FIG. 13A, at 1313 the method includes determining if EMPD assembly 200 is in the 4×2 position. If the 4×2 position has been reached, then the method may end at 1321 by outputting a 4×2 feedback signal to the vehicle controller. Alternatively, at 1314 the electromagnetic coil of coil assembly 322 may be energized if the EMPD assembly 200 is not the 4×2 position. At 1315, if the EMPD 200 is not at the EOS position, then the methods at 1316 and/or 1317 may be initiated to allow EMPD 200 to reach the EOS position without overheating the coil 502 by allowing cooling of the coil and adhering to the maximum allowable pulse time. Once the EMPD 200 is at the EOS position, then at 1318 the coil 220 may be de-energized to allow the EMPD 200 to translate in the opposite, negative axial direction. The position of EMPD 200 may be monitored by the sensor 1006 at 1319 until the method determines if EMPD 200 has reached the requested 4×2 position at 1320. If EMPD 200 has not reached the 4×2 position, then several of the methods of FIG. 13B may be repeated after determining whether or not the threshold number of shift attempts has been reached at 1323. Alternatively, if the 4×2 position has been reached, then at 1321 the 4×2 feedback signal may be outputted to the vehicle controller, thereby ending method 1300.

In this way, the EMPD assembly 200 may provide selective engagement between two rotating components while reducing electrical power consumption and not relying on vacuum as a power source. Since the latching system including the latching ring, latching grooves cage, and guiding grooves cage may hold the EMPD assembly 200 in the 4×4 and 4×2 positions, electrical current may only be provided when shifting between the 4×2 and 4×4 positions. Therefore, EMPD assembly 200 may conserve power where other disconnect assemblies may be provided with a continuous current. Furthermore, the floating aspect of the coil assembly 322 (e.g., movable slightly in the axial direction) as described above may increase the durability and longevity of the coil assembly 322 and armature cam 328. Additionally, the friction disk provided on the surface of the coil assembly 322 that is adapted to have face-sharing contact with the armature cam 328 when the electromagnetic coil is energized may further reduce wear between the coil assembly and armature cam.

Further still, the shape and arrangement of components of the EMPD assembly 200 may work together to make a more compact EMPD assembly, thereby increasing the flexibility of the assembly in different vehicles, drivetrain locations, and other applications. For example, the armature cam with the axially extending bidirectional ramps which interface with the radially extending guides and elongate apertures of the cam follower allow these components to nest together and reduce an axial length of the assembly, making the overall assembly more compact. Additionally, the combination of the interfacing teeth of the latching grooves cage, guiding grooves cage, and latching ring further increase the compact nature of the EMPD assembly.

In one embodiment, an electromagnetic disconnect assembly (e.g., an electromagnetic pulse disconnect assembly) includes: an electromagnetic coil assembly including an electromagnetic coil arranged within an annular housing of the coil assembly, where a first end of the annular housing includes a first face; an armature cam including an annular ring with an outer face and an inner face, a plurality of bidirectional cam ramps extending in an axial direction from the inner face, where the outer face is adapted to have face-sharing contact with the first face of the electromagnetic coil assembly when the electromagnetic coil is energized and be spaced apart from the first face via an air gap when the electromagnetic coil is de-energized; and a cam follower including an outer annular ring and an inner annular ring coupled together via a plurality of radially extending guides arranged around a circumference of the cam follower, the plurality of radially extending guides spaced apart from one another via a plurality of elongate apertures, each of the plurality of elongate apertures adapted to receive one of the plurality of bidirectional ramps of the armature cam. In a first example of the assembly, the first face is annular and includes a friction material arranged in a ring around an entirety of the first face, the friction material adapted to have face-sharing contact with the outer face of the armature cam when the electromagnetic coil is energized. A second example of the assembly optionally includes the first example and further includes, wherein a length of each of the plurality of elongate apertures, in a direction of a circumference of the inner and outer annular rings, is longer than a length of each of the plurality of radially extending guides, in the direction of the circumference of the inner and outer annular rings. A third example of the assembly optionally includes one or more of the first and second examples and further includes, wherein a planar connecting platform arranged in parallel with and coupled to the inner face separates each bidirectional cam ramp from adjacent bidirectional cam ramps of the plurality of bidirectional camp ramps and wherein each bidirectional cam ramp includes a first ramp and a second ramp that meet at an apex of the bidirectional camp ramp, the apex positioned away from the inner face of the annular ring of the armature cam, the first ramp extending outward from a first connecting platform to the apex and the second ramp extending outward from a different, second connecting platform to the apex, the first and second connecting platforms spaced apart from one another. A fourth example of the assembly optionally includes one or more of the first through third examples and further includes, wherein the length of each of the plurality of radially extending guides is the same as a length of each connecting platform and wherein each of the plurality of elongate apertures are shaped to fit around an entirety of a corresponding bidirectional ramp of the plurality of bidirectional ramps when the electromagnetic coil is de-energized. A fifth example of the assembly optionally includes one or more of the first through fourth examples and further includes, wherein the annular housing includes a second end, the second end having a second face arranged opposite to the first face, the second face having an annular slot depressed inward into the second face. A sixth example of the assembly optionally includes one or more of the first through fifth examples and further includes an annular spacer adapted to fit within the annular slot, the annular spacer coupled with a housing of the electromagnetic disconnect assembly, the electromagnetic coil assembly, annular spacer, armature cam, and cam follower all arranged within an interior of the housing of the electromagnetic disconnect assembly. A seventh example of the assembly optionally includes one or more of the first through sixth examples and further includes, wherein the electromagnetic coil assembly further includes four coil springs arranged around the annular housing an extending axially across the annular housing, where only two of the four coil springs are electrically coupled to the electromagnetic coil. An eighth example of the assembly optionally includes one or more of the first through seventh examples and further includes, wherein each of the first face, inner face, and outer face are arranged parallel to one another and normal to a central axis of the electromagnetic disconnect assembly and wherein the radially extending guides extend radially between the outer annular ring and inner annular ring relative to the central axis. A ninth example of the assembly optionally includes one or more of the first through eighth examples and further includes, wherein the inner annular ring of the cam follower includes a plurality of teeth arranged around a circumference of an inner surface of the inner annular ring and further comprising clutch ring adapted to translate axially between an engaged position where the clutch ring couples two rotating components to one another and a disengaged position where the clutch ring is only coupled to one of the two rotating components, where the cam follower is arranged adjacent to the clutch ring and the clutch ring is adapted to move axially with axial movement of the cam follower. A tenth example of the assembly optionally includes one or more of the first through ninth examples and further includes a latching system including a latching ring positioned between a stationary latching grooves cage and stationary guiding grooves cages coupled to one another, the latching ring adapted to translate axially within a space formed within the coupled together latching grooves cage and guiding grooves cage, the latching ring surrounding a clutch ring cage housing the clutch ring and adapted to translate axially along with the clutch ring.

In another embodiment, an electromagnetic disconnect assembly (e.g., an electromagnetic pulse disconnect assembly) includes: an electromagnetic coil assembly; a clutch ring; and a latching system adapted to hold the clutch ring in a first, engaged position where the clutch ring connects two rotating components or a second, disengaged position where the clutch ring is only connected to one of the two rotating components, after energizing the electromagnetic coil assembly to move the clutch ring into either the first or second position and after de-energizing the electromagnetic coil assembly, the latching system comprising: an annular, latching ring including a first set of teeth arranged on a first side of the latching ring and having a first profile with a single, same-depth tooth pattern that repeats around a circumference of the latching ring and a second set of teeth arranged on an opposite, second side of the latching ring and having a second profile with a different-depth tooth pattern having two different depths that repeats around the circumference of the latching ring; a guiding grooves cage including a third set of teeth adapted to interface with the first set of teeth in a single position; and a latching grooves cage including a fourth set of teeth adapted to interface with the second set of teeth in two different locking positions. In a first example of the assembly, the second profile of the second set of teeth includes a deeper groove and a shallower groove which repeat continuously around the circumference of the latching ring. A second example of the assembly optionally includes the first example and further includes, wherein when the clutch ring is in the first position each tooth of the fourth set of teeth is positioned within one shallower groove of the second set of teeth and wherein when the clutch ring is in the second position each tooth of the fourth set of teeth is position within one deeper groove of the second set of teeth. A third example of the assembly optionally includes one or more of the first and second examples and further includes, wherein the guiding grooves cage and the latching grooves cage are rotationally and axially fixed, relative to a central axis of the electromagnetic disconnect assembly, and wherein the guiding grooves cage and latching grooves cage are coupled to one another at outer walls of the guiding grooves cage and latching grooves cage. A fourth example of the assembly optionally includes one or more of the first through third examples and further includes, wherein the third set of teeth are formed on an inner wall of the guiding grooves cage and extend in an axial direction, relative to the central axis, toward the latching grooves cage and wherein the fourth set of teeth are formed on an inner wall of the latching grooves cage and extend in the axial direction toward to guiding grooves cage, where a space is formed between ends of the third set of teeth and the fourth set of teeth. A fifth example of the assembly optionally includes one or more of the first through fourth examples and further includes, wherein the latching ring is positioned within the space and is free to rotate and translate axially, between the third set of teeth and fourth set of teeth. A sixth example of the assembly optionally includes one or more of the first through fifth examples and further includes an armature cam including a plurality of bidirectional ramps extending axially from an annular ring and a cam follower including a plurality of radially extending guides spaced apart from one another via a plurality of elongate apertures, the plurality of bidirectional ramps adapted to fit within the plurality of elongate apertures and wherein the armature cam is adapted to have face sharing contact with the electromagnetic coil assembly when the electromagnetic coil assembly is energized.

In yet another embodiment, a method (e.g., a method for an electromagnetic pulse disconnect assembly) includes: in response to each of a first command to shift a clutch ring of an electromagnetic pulse disconnect (EMPD) assembly from a first position, where two rotating components are coupled together via the clutch ring, to a second position, where the two rotating components are not coupled together via the clutch ring, and a second command to shift the clutch ring from the second position to the first position, energizing an electromagnetic coil of an electromagnetic coil assembly in the EMPD assembly; in response to sensing via a sensor on a controller arranged outside of a latching grooves cage of the EMPD assembly that the EMPD assembly is in an end-of-shift position, de-energizing the electromagnetic coil, the end-of-shift position defined by the clutch ring being coupled to each of the two rotating components and a first set of teeth of a latching ring being engaged with a second set of teeth of a guiding grooves cage coupled to the latching grooves cage, where the first set of teeth are defined by a single-depth repeating groove around an entire circumference of the latching ring, the latching ring further including a third set of teeth defined by a deeper groove and shallower groove that repeat around the entire circumference of the latching ring, the third set of teeth adapted to interface in two different positions with a fourth set of teeth of the latching grooves cage, the latching ring surrounding a clutch ring cage housing the clutch ring and adapted to translate axially together with the clutch ring in a space created inside the coupled together latching grooves cage and guiding grooves cage; and after de-energizing the electromagnetic coil, sensing via the sensor that the clutch ring is in the commanded first position or second position, where in each of the first position and the second position the third set of teeth of the latching ring is engaged with the fourth set of teeth of the latching grooves cage and positioned axially away from the second set of teeth of the guiding grooves cage. In a first example of the method, sensing via the sensor includes sensing an axial position, relative to a central rotational axis of the EMPD assembly, of a magnet assembly arranged on a shift fork of the EMPD assembly, the latching ring surrounding the shift fork and the shift fork adapted to move axially together with the latching ring and clutch ring.

In another representation, a method of operating a disconnect assembly of a shaft, comprises: driving a clutch ring and a latching system of the disconnect assembly from a first self-locking position to a second self-locking position via an electromagnetic coil generating an axial force through an armature cam and cam follower assembly, the armature cam including a series of bi-directional ramps interfacing with radially extending guides of the cam follower, the guides positioned around a circumference of the cam follower and spaced apart from one another via elongate apertures adapted to receive the series of bidirectional ramps, the coil energized only during transitions between the first and second self-locking positions, the first and second self-locking positions including a shaft engaging position and a shaft disengaging position; activating and then deactivating the coil to transition the clutch ring and latching system from the first self-locking position to the second self-locking position and activating and deactivating the coil to transition the clutch ring and latching system from the second self-locking position to the first self-locking position; and maintaining the clutch ring and latching system in the first self-locking position or the second self-locking position when the coil is deactivated, even when transmitting and not transmitting torque and rotation of the shaft through the disconnect assembly. In a first example of the method, the clutch ring includes a plurality of teeth for selectively engaging the shaft, the clutch ring coupled with the latching system and wherein driving the clutch ring and latching system includes translating the clutch ring and a latching ring of the latching system positioned adjacent to the cam follower axially together, in a direction of a central axis of the disconnect assembly, between the first and second self-locking positions while the clutch ring and the latching ring rotate independent of each other. A second example of the method optionally includes the first example and further includes sensing the first and second self-locking positions via a sensor arranged on a controller of the disconnect assembly, where the sensing includes sensing a magnet assembly arranged on a shift fork that moves axially together with the latching ring and clutch ring.

In yet another representation, an electromagnetic disconnect assembly (e.g., an electromagnetic pulse disconnect assembly) comprises an electromagnetic coil assembly including an electromagnetic coil arranged within an annular housing of the coil assembly; an armature cam including an annular ring and a plurality of bidirectional cam ramps extending in an axial direction from the annular ring, where the annular ring is adapted to have face-sharing contact with the electromagnetic coil assembly when the electromagnetic coil is energized and be spaced apart from the electromagnetic coil assembly when the electromagnetic coil is de-energized; and a cam follower including a plurality of radially extending guides arranged around a circumference of the cam follower, the plurality of radially extending guides spaced apart from one another via a plurality of elongate apertures, each of the plurality of elongate apertures adapted to receive one of the plurality of bidirectional ramps of the armature cam. In a first example of the assembly, the assembly further comprises a clutch ring and a latching system adapted to hold the clutch ring in a first, engaged position where the clutch ring connects two rotating components or a second, disengaged position where the clutch ring is only connected to one of the two rotating components, after energizing the electromagnetic coil assembly to move the clutch ring into either the first or second position and after de-energizing the electromagnetic coil assembly, the latching system comprising: an annular latching ring positioned in a space created by outer wall of a guiding grooves cage and a latching grooves cage of the latching system, the guiding grooves cage coupled to the latching grooves cage via the outer walls. A second example of the assembly optionally includes the first example and further includes wherein the latching ring includes a first set of teeth arranged on a first side of the latching ring and having a first profile with a single, same-depth tooth pattern that repeats around a circumference of the latching ring and a second set of teeth arranged on an opposite, second side of the latching ring and having a second profile with a different-depth tooth pattern having two different depths that repeats around the circumference of the latching ring. A third example of the assembly optionally includes one or more of the first and second examples and further includes wherein the guiding grooves cage includes a third set of teeth adapted to interface with the first set of teeth in a single position and wherein the latching grooves cage includes a fourth set of teeth adapted to interface with the second set of teeth in two different locking positions.

In still another representation, an electromagnetic disconnect assembly (e.g., an electromagnetic pulse disconnect assembly) comprises a clutch ring adapted to selectively connect and disconnect two rotating components, an electromagnetic coil assembly, a cam follower adapted to rotate along with one of the two rotating components via a plurality of teeth arranged around an inner surface of the cam follower, an armature cam adapted to rotate along with the cam follower when the electromagnetic coil assembly is de-energized and stop rotating with the cam follower when the electromagnetic coil assembly is energized, and a latching system adapted to hold the clutch ring in selective connection and disconnection with the two rotating components, even when the electromagnetic coil assembly is de-energized, a latching ring of the latching system adapted to translate axially with the cam follower, the cam follower adapted to move axially away from the armature cam when the electromagnetic coil assembly is energized.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electromagnetic disconnect assembly, comprising:
an electromagnetic coil assembly;
a clutch ring; and
a latching system adapted to hold the clutch ring in a first, engaged position where the clutch ring connects two rotating components or a second, disengaged position where the clutch ring is only connected to one of the two rotating components, after energizing the electromagnetic coil assembly to move the clutch ring into either the first or second position and after de-energizing the electromagnetic coil assembly, the latching system comprising:
an annular, latching ring including a first set of teeth arranged on a first side of the latching ring and having a first profile with a single, same-depth tooth pattern that repeats around a circumference of the latching ring and a second set of teeth arranged on an opposite, second side of the latching ring and having a second profile with a different-depth tooth pattern having two different depths that repeats around the circumference of the latching ring;
a guiding grooves cage including a third set of teeth adapted to interface with the first set of teeth in a single axial position; and
a latching grooves cage including a fourth set of teeth adapted to interface with the second set of teeth in two different axial locking positions.

2. The assembly of claim 1, wherein the second profile of the second set of teeth includes a deeper groove and a shallower groove which repeat continuously around the circumference of the latching ring.

3. The assembly of claim 2, wherein when the clutch ring is in the first position each tooth of the fourth set of teeth is positioned within one shallower groove of the second set of teeth and wherein when the clutch ring is in the second position each tooth of the fourth set of teeth is positioned within one deeper groove of the second set of teeth.

4. The assembly of claim 1, wherein the guiding grooves cage and the latching grooves cage are rotationally and axially fixed, relative to a central axis of the electromagnetic disconnect assembly, and wherein the guiding grooves cage and latching grooves cage are coupled to one another at outer walls of the guiding grooves cage and latching grooves cage.

5. The assembly of claim 4, wherein the third set of teeth are formed on an inner wall of the guiding grooves cage and extend in an axial direction, relative to the central axis, toward the latching grooves cage and wherein the fourth set of teeth are formed on an inner wall of the latching grooves cage and extend in the axial direction toward to guiding grooves cage, where a space is formed between ends of the third set of teeth and the fourth set of teeth.

6. The assembly of claim 5, wherein the latching ring is positioned within the space and is free to rotate and translate axially, between the third set of teeth and fourth set of teeth.

7. The assembly of claim 1, further comprising an armature cam including a plurality of bidirectional ramps extending axially from an annular ring and a cam follower including a plurality of radially extending guides spaced apart from one another via a plurality of elongate apertures, the plurality of bidirectional ramps adapted to fit within the plurality of elongate apertures and wherein the armature cam is adapted to have face sharing contact with the electromagnetic coil assembly when the electromagnetic coil assembly is energized.

8. The assembly of claim 1, wherein the electromagnetic coil assembly further includes four coil springs arranged around an annular housing an extending axially across the annular housing, where only two of the four coil springs are electrically coupled to the electromagnetic coil.

9. The assembly of claim 8, wherein two of the coil springs are connected to and receive control signal from a controller.

10. The assembly of claim 8, wherein the four coil springs are configured to cause the clutch ring to move into the first or second position upon de-energizing of the electromagnetic coil assembly.

11. The assembly of claim 8, wherein energizing of the electromagnetic coil assembly creates a magnetic force which overcomes a spring force of the four coil springs to cause the clutch ring to move into the first or second position.

12. The assembly of claim 1, further comprising a cushion arranged adjacent to the second teeth and comprising a noise dampening material.

\* \* \* \* \*